United States Patent
Yu et al.

(10) Patent No.: US 11,224,811 B2
(45) Date of Patent: Jan. 18, 2022

(54) INFORMATION DISPLAY METHOD AND APPARATUS IN BATTLE GAME, TERMINAL, AND STORAGE MEDIUM

(71) Applicant: TENCENT TECHNOLOGY (SHENZHEN) COMPANY LTD, Guangdong (CN)

(72) Inventors: Cheng Chi Yu, Shenzhen (CN); Chen Liang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 17/004,201

(22) Filed: Aug. 27, 2020

(65) Prior Publication Data

US 2020/0391111 A1  Dec. 17, 2020

Related U.S. Application Data

(63) Continuation of application No. PCT/CN2019/091287, filed on Jun. 14, 2019.

(30) Foreign Application Priority Data

Jul. 13, 2018 (CN) .......................... 201810770813.7

(51) Int. Cl.
   *A63F 13/537* (2014.01)
   *A63F 13/822* (2014.01)

(52) U.S. Cl.
   CPC .......... *A63F 13/537* (2014.09); *A63F 13/822* (2014.09); *A63F 2300/303* (2013.01)

(58) Field of Classification Search
   CPC . A63F 13/537; A63F 13/822; A63F 2300/303
   See application file for complete search history.

(56) References Cited

U.S. PATENT DOCUMENTS 6,251,012 B1 * 6/2001 Horigami ................ A63F 13/10
                                                              463/7
6,267,674 B1 * 7/2001 Kondo .................... A63F 13/10
                                                              463/32
(Continued)

FOREIGN PATENT DOCUMENTS

CN          103083904 A     5/2013
CN          203090439 U     7/2013
(Continued)

OTHER PUBLICATIONS

Translation of the Written Opinion of the International Searching Authority dated Sep. 17, 2019 in International Application No. PCT/CN2019/091287, WOP submitted on Aug. 27, 2020.
(Continued)

*Primary Examiner* — Steve Rowland
(74) *Attorney, Agent, or Firm* — Sughrue Mion, PLLC

(57) ABSTRACT

An information display method in a battle game is provided, applied to a terminal on which a first client is run, the method including: obtaining a first combat power value of a first game role; receiving a second combat power value of a second game role controlled by a second client or an Artificial Intelligence (AI) program; obtaining, according to the second combat power value and the first combat power value, a combat power difference between the second game role and the first game role; determining, according to the combat power difference, a display mode of the second combat power value; and displaying a battle interface, the battle interface including an object corresponding to the second game role and the second combat power value displayed in the display mode, the second combat power value being located in a peripheral position of the object corresponding to the second game role.

18 Claims, 10 Drawing Sheets

(56) References Cited

U.S. PATENT DOCUMENTS

| | | | | |
|---|---|---|---|---|
| 6,273,822 | B1* | 8/2001 | Tanaka | A63F 13/10 463/43 |
| 2002/0142834 | A1* | 10/2002 | Sobue | A63F 13/525 463/30 |
| 2004/0259634 | A1* | 12/2004 | Machida | A63F 13/5375 463/29 |
| 2005/0014543 | A1* | 1/2005 | Itoi | A63F 13/58 463/8 |
| 2006/0287027 | A1* | 12/2006 | Hardisty | A63F 13/42 463/8 |
| 2007/0032282 | A1* | 2/2007 | Hamamoto | A63F 13/533 463/9 |
| 2007/0213107 | A1* | 9/2007 | Itou | A63F 13/56 463/1 |
| 2007/0265047 | A1* | 11/2007 | Nomura | A63F 13/00 463/8 |
| 2008/0200226 | A1* | 8/2008 | Ichimura | G07F 17/32 463/8 |
| 2009/0098919 | A1* | 4/2009 | Yuji | A63F 13/822 463/9 |
| 2010/0311503 | A1* | 12/2010 | McMain | A63F 13/537 463/36 |
| 2013/0005417 | A1* | 1/2013 | Schmidt | A63F 13/5378 463/5 |
| 2014/0243079 | A1* | 8/2014 | Tsukioka | A63F 13/10 463/29 |
| 2014/0329602 | A1* | 11/2014 | Hisaoka | A63F 13/822 463/42 |
| 2015/0038226 | A1* | 2/2015 | Maeda | A63F 13/25 463/31 |
| 2016/0236087 | A1* | 8/2016 | McNeil | A63F 13/87 |
| 2017/0266557 | A1* | 9/2017 | Fujiwara | A63F 13/825 |
| 2018/0077063 | A1* | 3/2018 | Kurabayashi | A63F 13/53 |
| 2018/0280800 | A1* | 10/2018 | Fujikawa | A63F 13/35 |

FOREIGN PATENT DOCUMENTS

| | | |
|---|---|---|
| CN | 105641932 A | 6/2016 |
| CN | 106730839 A | 5/2017 |
| CN | 107096226 A | 8/2017 |
| CN | 107335222 A | 11/2017 |
| CN | 108025215 A | 5/2018 |
| CN | 108970115 A | 12/2018 |
| JP | 2009-005790 A | 1/2009 |

OTHER PUBLICATIONS

International search report for PCT/CN2019/091287 dated Sep. 17, 2019.
Written opinion in Chinese for PCT/CN2019/091287 dated Sep. 17, 2019.
Office action for Chinese Patent Application No. 201810770813.7 dated Aug. 8, 2019.
Office action for Chinese Patent Application No. 201810770813.7 dated Nov. 18, 2019.

* cited by examiner

INFORMATION DISPLAY METHOD AND APPARATUS IN BATTLE GAME, TERMINAL, AND STORAGE MEDIUM

CROSS-REFERENCE TO RELATED APPLICATION(S)

This application is a bypass continuation application of International Application No. PCT/CN2019/091287, filed on Jun. 14, 2019, which claims priority to Chinese Patent Application No. 201810770813.7, entitled "INFORMATION DISPLAY METHOD AND APPARATUS IN BATTLE GAME, DEVICE, AND STORAGE MEDIUM" filed with the China National Intellectual Property Administration on Jul. 13, 2018, the disclosures of which are herein incorporated by reference in their entireties.

FIELD

Embodiments of the disclosure relate to the field of man-machine interaction, and in particular, to an information display method and apparatus in a battle game, a terminal, and a storage medium.

BACKGROUND

A battle game is a game in which a plurality of user accounts compete in the same scenario. Optionally, the battle game may be a multiplayer online battle arena (MOBA) game.

In a typical MOBA game, each user account operates a hero role, and improves a combat power of the hero role by, for example, increasing a level, equipment, and buff effect of the hero role. When a combat power of a first hero role is less than that of an enemy second hero role, if there is a competitive battle between the first hero role and the second hero role, it is very likely that the first hero role will lose. In the related art, a MOBA game client provides an information display panel for hero roles. A user may manually open the information display panel at any moment during the competition, and the information display panel displays levels, equipment and buff effects of a hero role(s) corresponding to the user and an enemy hero role(s). The user estimates an approximate combat power of each hero role based on a level, equipment and buff effect of each hero role displayed on the information display panel, then manually closes the information display panel, and then decides, during the competition, whether to combat with the enemy hero role(s), which causes much inconvenience and inefficiency in playing the game.

Specifically, because the game rhythm of the MOBA game is very fast, when the user manually opens the information display panel, views the information display panel, estimates the approximate combat ability of each hero role, and manually closes the information display panel, the entire process may take a few seconds, and this time period is sufficiently long in a group battle, resulting in a low efficiency of human-computer interaction between the user and a terminal, and failing to meet the timeliness requirements of the battle game.

SUMMARY

According to an aspect of an example embodiment, there is provided an information display method in a battle game is provided, performed by a terminal on which a first client is run, the method including:

obtaining a first combat power value of a first game role, the first game role being a game role controlled by the first client;

receiving a second combat power value of a second game role, the second game role being a game role controlled by a second client or an Artificial Intelligence (AI) program;

obtaining, according to the second combat power value and the first combat power value, a combat power difference between the second game role and the first game role;

determining, according to the combat power difference, a display mode of the second combat power value; and displaying a battle interface, the battle interface including an object corresponding to the second game role and the second combat power value displayed in the display mode, the second combat power value being located in a peripheral position of the object corresponding to the second game role.

An information display method in a battle game is provided, performed by a terminal on which a first client is run, the first client being configured to control a first game role, the method including:

obtaining n types of battle status information of the first game role, the n types of battle status information including information related to a combat power of the first game role;

quantifying the n types of battle status information, to obtain a first combat power value of the first game role; and displaying a first battle interface, the first battle interface including an object corresponding to the first game role and the first combat power value, the first combat power value being located in a peripheral position of the object corresponding to the first game role.

In an embodiment, the generating, in a case that the battle status information changes, a combat power change value according to the changed battle status information includes:

calculating, in a case that the battle status information changes, the changed first combat power value according to the changed battle status information; and subtracting the first combat power value from the changed first combat power value to obtain the combat power change value.

In an embodiment, the method further includes:

transmitting the changed first combat power value to a second client in the same battle game;

the second client being configured to display a fourth battle screen, the fourth battle screen including the first game role and the changed first combat power value, the changed first combat power value being located in the peripheral position of the first game role.

In an embodiment, the method further includes:

determining, in a case that the combat power difference is greater than a first interval threshold, that the second combat power value uses a first background color;

determining, in a case that the combat power difference is greater than a second interval threshold and is less than the first interval threshold, that the second combat power value uses a second background color;

determining, in a case that the combat power difference is greater than a third interval threshold and is less than the second interval threshold, that the second combat power value uses a third background color;

determining, in a case that the combat power difference is greater than a fourth interval threshold and is less than the third interval threshold, that the second combat power value uses a fourth background color; and determining, in a case that the combat power difference is less than the fourth interval threshold, that the second combat power value uses a fifth background color;

the first interval threshold>the second interval threshold>the third interval threshold>the fourth interval threshold.

According to an aspect of an example embodiment, there is provided an information display apparatus in a battle game is provided, including:

an obtaining module, configured to obtain a first combat power value of a first game role, the first game role being a game role controlled by a first client;

a receiving module, configured to receive a second combat power value of a second game role, the second game role being a game role controlled by a second client or an Artificial Intelligence (AI) program;

a quantification module, configured to obtain, according to the second combat power value and the first combat power value, a combat power difference between the second game role and the first game role;

a determining module, configured to determine, according to the combat power difference, a display mode of the second combat power value; and a display module, configured to display a battle interface, the battle interface including an object corresponding to the second game role and the second combat power value displayed in the display mode, the second combat power value being located in a peripheral position of the object corresponding to the second game role.

According to an aspect of an example embodiment, there is provided an information display apparatus in a battle game is provided, configured to control a first game role, the apparatus including:

an obtaining module, configured to obtain n types of battle status information of the first game role, the n types of battle status information including information related to a combat power of the first game role;

a quantification module, configured to quantify the n types of battle status information, to obtain a first combat power value of the first game role; and a display module, configured to display a first battle interface, the first battle interface including an object corresponding to the first game role and the first combat power value, the first combat power value being located in a peripheral position of the object corresponding to the first game role.

According to an aspect of an example embodiment, there is provided a terminal is provided, including a memory and a processor; the memory storing at least one computer-readable instruction, and the at least one computer-readable instruction being loaded and executed by the processor to implement the following operations:

obtaining a first combat power value of a first game role, the first game role being a game role controlled by a first client;

receiving a second combat power value of a second game role, the second game role being a game role controlled by a second client or an Artificial Intelligence (AI) program;

obtaining, according to the second combat power value and the first combat power value, a combat power difference between the second game role and the first game role;

determining, according to the combat power difference, a display mode of the second combat power value; and displaying a battle interface, the battle interface including an object corresponding to the second game role and the second combat power value displayed in the display mode, the second combat power value being located in a peripheral position of the object corresponding to the second game role.

According to an aspect of an example embodiment, there is provided a terminal is provided, including a memory and a processor; the memory storing at least one computer-readable instruction, and the at least one computer-readable instruction being loaded and executed by the processor to implement the following operations:

obtaining n types of battle status information of the first game role, the n types of battle status information including information related to a combat power of the first game role, n being an integer greater than or equal to 2;

quantifying the n types of battle status information, to obtain a first combat power value of the first game role; and displaying a first battle interface, the first battle interface including an object corresponding to the first game role and the first combat power value, the first combat power value being located in a peripheral position of the object corresponding to the first game role.

According to an aspect of an example embodiment, there is provided a computer-readable storage medium is provided, storing at least one computer-readable instruction, the at least one computer-readable instruction being loaded and executed by a processor to implement the following operations:

obtaining a first combat power value of a first game role, the first game role being a game role controlled by a first client;

receiving a second combat power value of a second game role, the second game role being a game role controlled by a second client or an Artificial Intelligence (AI) program;

obtaining, according to the second combat power value and the first combat power value, a combat power difference between the second game role and the first game role;

determining, according to the combat power difference, a display mode of the second combat power value; and displaying a battle interface, the battle interface including an object corresponding to the second game role and the second combat power value displayed in the display mode, the second combat power value being located in a peripheral position of the object corresponding to the second game role.

According to an aspect of an example embodiment, there is provided a computer-readable storage medium is provided, storing at least one computer-readable instruction, the at least one computer-readable instruction being loaded and executed by a processor to implement the following operations:

obtaining n types of battle status information of the first game role, the n types of battle status information including information related to a combat power of the first game role, n being an integer greater than or equal to 2;

quantifying the n types of battle status information, to obtain a first combat power value of the first game role; and displaying a first battle interface, the first battle interface including an object corresponding to the first game role and the first combat power value, the first combat power value being located in a peripheral position of the object corresponding to the first game role.

BRIEF DESCRIPTION OF THE DRAWINGS

The following briefly describes the accompanying drawings for describing example embodiments. Apparently, the accompanying drawings in the following descriptions show merely some example embodiments of the disclosure, and a person of ordinary skill in the art may still derive other drawings and/or embodiments from the accompanying drawings without creative efforts.

DETAILED DESCRIPTION

To make objectives, technical solutions, and advantages of the embodiments of the disclosure clearer, the following further describes in detail implementations of the disclosure with reference to the accompanying drawings.

Throughout the disclosure, the expression such as "at least one of a, b, and c" or "at least one of a, b or c" indicates only a, only b, only c, both a and b, both a and c, both b and c, all of a, b, and c, or any combinations or variations thereof.

A multiplayer online battle arena (MOBA) game is a multiplayer online battle arena game, and may also be referred to as a role-playing action real time strategy (action RTS or ARTS) game. A gameplay of this type of game is as follows: players are generally required to purchase equipment for combat, players are normally divided into two teams, the two teams compete against each other in a scattered game map, and each player controls a selected role through an RTS-style interface. Generally, each player may only need to control a role selected by the player. The meaning of the terms used in the specification is as follows.

Combat power: a value of a combat power of a game role in a MOBA game. The combat power of the game role may be related to a plurality of factors at the same time, and may include at least one of a role level of the game role, a skill quantity owned, a skill type owned, a skill level owned, an equipment quantity owned, an equipment type owned, an equipment level owned, and a buff type and quantity owned.

Buff: a buff magic effect acting on a game role. Generally, the buff effect is obtained by controlling the game role to kill a neutral creature in a game.

Hereinafter, the term "game role" may be used to include any display object such as a character corresponding to a game role on a screen of a game playing.

Figure 1:
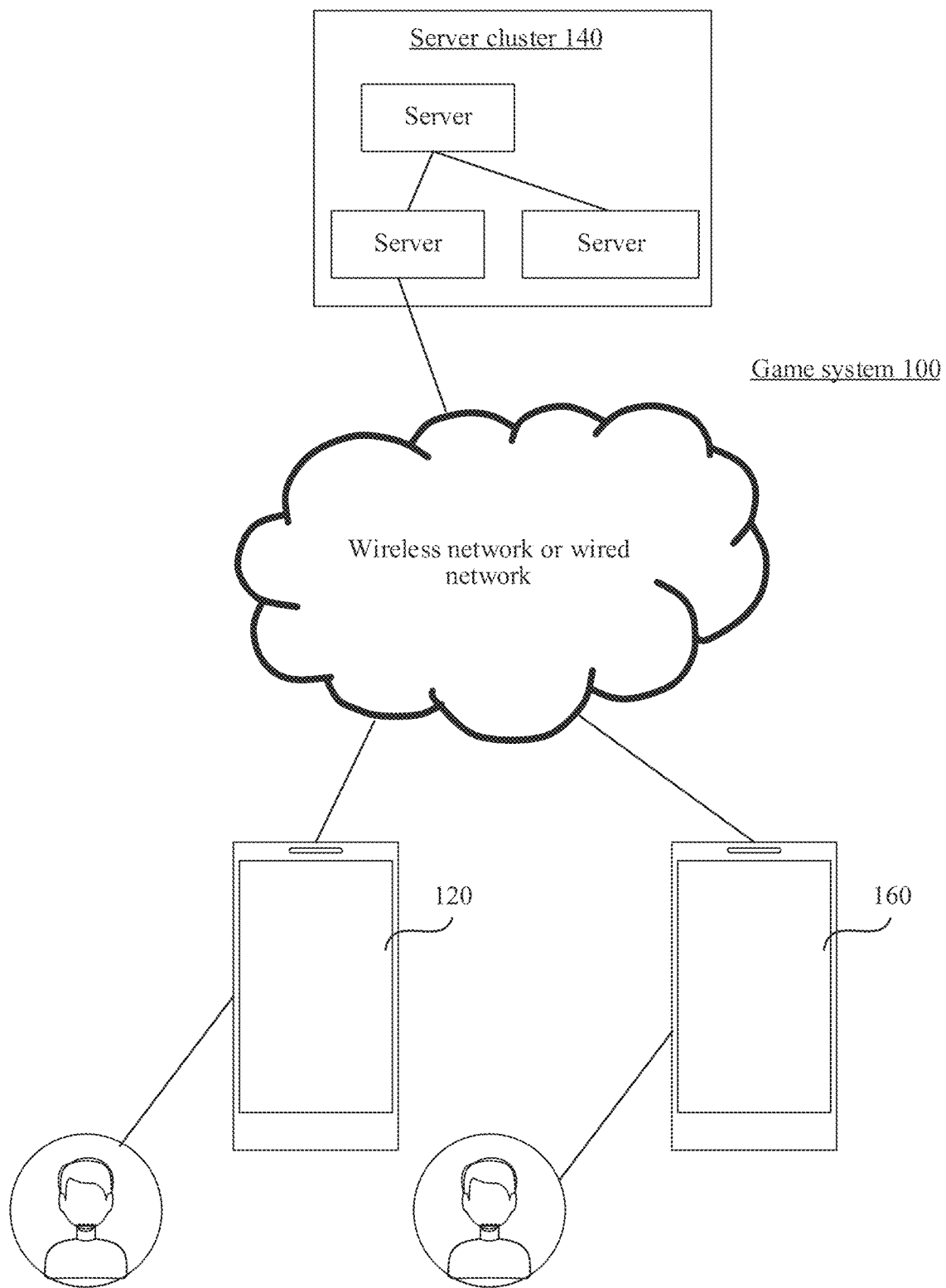
FIG. 1 is a structural block diagram of a game system according to an example embodiment of the disclosure.

FIG. 1 is a structural block diagram of a game system 100 according to an example embodiment of the disclosure. The game system 100 includes a first terminal 120, a server cluster 140, and a second terminal 160.

The first terminal 120 is connected to the server cluster 140 by using a wireless network or a wired network. The first terminal 120 may be at least one of a smartphone, a game console, a desktop computer, a tablet computer, an e-book reader, an MP3 player, an MP4 player, and a portable laptop computer. A battle game client is installed and run on the first terminal 120, and may be referred to as a game client, a battle client or a client. The client may be any one of a real-time battle game client, a role-playing game client, a multiplayer online battle arena game client, a multiplayer online shooting game client, and a multiplayer online survival game client. The first terminal 120 is a terminal used by a first user, and a first user account logs in to the client in the first terminal 120.

The first terminal 120 is connected to the server 140 by using a wireless network or a wired network.

The server cluster 140 includes at least one of one server, a plurality of servers, a cloud computing platform, and a virtualization center. The server cluster 140 is configured to provide a background service for a client (e.g., client that supports a virtual pet). Optionally, the server cluster 140 takes on primary computing work, and the first terminal 120 and the second terminal 160 take on secondary computing work; alternatively, the server cluster 140 takes on secondary computing work, and the first terminal 120 and the second terminal 160 take on primary computing work; alternatively, collaborative computing is performed by using a distributed computing architecture among the server cluster 140, the first terminal 120, and the second terminal 160.

A battle game client is installed and run on the second terminal 160, and may be referred to as a client. The client may be any one of a real-time battle game client, a role-playing game client, a multiplayer online battle arena game client, a multiplayer online shooting game client, and a multiplayer online survival game client. The second terminal 160 is a terminal used by a second user. A second user account logs in to the client in the second terminal 160.

Optionally, the first user account and the second user account are in the same virtual social network. Optionally, the first user account and the second user account may belong to the same team or the same organization, have a friend relationship, or have a temporary communication permission. Optionally, the first user account and the second user account may alternatively belong to different teams, different organizations, or two groups hostile to each other.

Optionally, the clients installed on the first terminal 120 are the same as those installed on the second terminal 160, or the clients installed on the two terminals are the same type of clients of different operating system platforms. Different operating systems include: an Android operating system, an IOS operating system, a Windows operating system, and an operating system dedicated to a game console.

The first terminal 120 may generally refer to one of a plurality of terminals, the second terminal 160 may generally refer to one of a plurality of terminals, and in this embodiment, description is made by using only the first terminal 120 and the second terminal 160 as an example. Terminal types of the first terminal 120 and the second terminal 160 are the same or different. The terminal type includes at least one of a smartphone, a game console, a desktop computer, a tablet computer, an e-book reader, an MP3 player, an MP4 player, and a laptop computer. In the following embodiments, description is made by using an example in which the first terminal 120 and/or the second terminal 160 is a smartphone.

A person skilled in the art would understand that there may be more or fewer terminals. For example, there may be only one terminal, or there may be dozens of or hundreds of or more terminals. The quantity and the device types of the terminals are not limited in the embodiments of the disclosure. Typically, several terminals, for example, 8 or 10 terminals, may be required to participate in a battle game. Game roles of the several terminals may be divided into two opponent teams to compete in battle.

Figure 2:
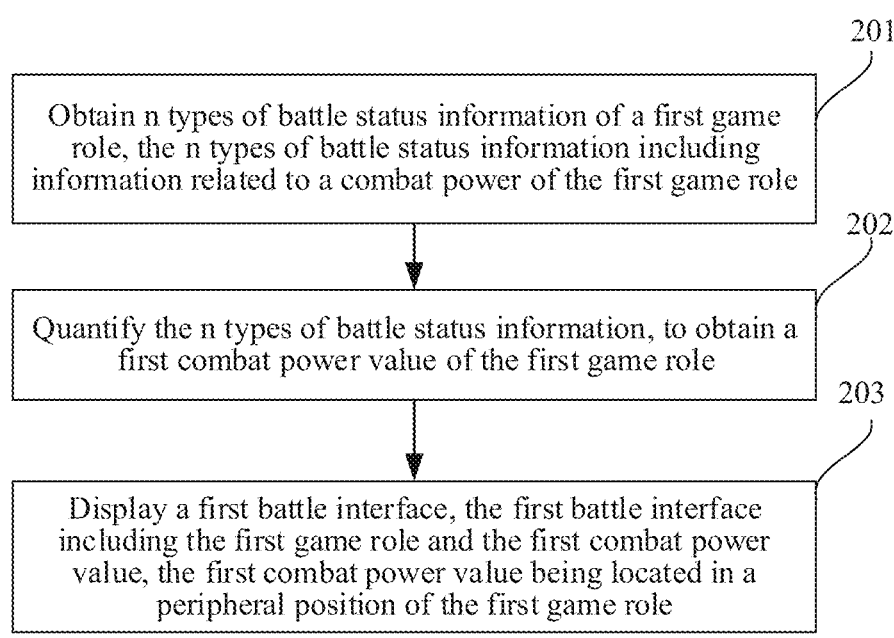
FIG. 2 is a flowchart of an information display method in a battle game according to an example embodiment of the disclosure.

FIG. 2 is a flowchart of an information display method in a battle game according to an example embodiment of the disclosure. This embodiment is described by using an example in which the method is applied to the first terminal 120 or the second terminal 160 shown in FIG. 1. The method includes the following operations 201-203:

Operation 201. Obtain n types of battle status information of a first game role, the n types of battle status information including information related to a combat power of the first game role. Here, n may be an integer greater than or equal to 2.

Optionally, each client in the battle game is configured to control one (or more) corresponding game role(s). For example, game roles such as creeps and monsters in a battle game are controlled by the client or server, and hero roles in a battle game are controlled by the clients. The hero role is a game role that has a better combat ability than that of creeps and monsters. In an embodiment, in the same battle game, some hero roles may be controlled by artificial intelligence (AI) programs in the client or server.

Optionally, a game role controlled by the current client is the first game role.

Optionally, the n types of battle status information of the first game role include information related to a combat power of the first game role. A combat power of a game role is related to a plurality of types of battle status information in real time at the same time. Therefore, it is relatively difficult for a common user to view n types of battle status information and estimate the combat power.

Operation 202. Quantify the n types of battle status information, to obtain a first combat power value of the first game role.

Most types of battle status information are non-quantitative information. Therefore, an ordinary player needs to have a very deep understanding of each game role and equipment in the battle game before the player may estimate the first combat power value of the first game role.

In this embodiment, the n types of battle status information are quantified by using a quantization algorithm, to obtain a first combat power value of the first game role through quantification. Optionally, a specific form of the quantization algorithm is not limited, provided that the combat power of the first game role may be objectively reflected.

Optionally, the combat power value is represented by four digits. The combat power value is used for representing a comprehensive combat power index obtained through calculation according to at least two types of battle status information of the first game role. In some embodiments, the combat power value may also be affected by an effect of a current battle environment in which the first game role is located on the game role, and a buff or restraint effect of other game roles on the first game role.

Operation 203. Display a first battle interface, the first battle interface including the first game role and the first combat power value, the first combat power value being located in a peripheral position of the first game role (e.g., adjacent to a position of an object or a character corresponding to the first game role).

The client may further display a battle interface. The battle interface may be a battle environment screen generated based on a virtual environment. The battle environment screen displays a map of the virtual environment, and at least one game role located on the map. The game role includes: the first game role controlled by the current client and/or other game roles controlled by other clients. In some embodiments, the other game roles are further divided into friendly game roles and enemy game roles.

The client displays the first battle interface by default. The first battle interface is an interface in which the first game role is a main observation object. A corresponding combat power value is further displayed in the peripheral position of the first game role, and the combat power value is used for representing a real-time combat power of the first game role.

Optionally, the peripheral position is a position around an object or a character such as, for example but not limited to, above a head or a below a foot of the character corresponding to the game role. When the position above the head of the game role includes a nickname and a health bar (e.g., including a health point) of the game role, the peripheral position may be a position below a health bar of the game role. Optionally, the first combat power value may move along with the first game role, that is, a display position of the first combat power value is fixed relative to that of the first game role.

Thus, according to the method provided in this embodiment, the battle status information of the first game role is quantified to obtain the combat power value of the first game role, and the combat power value is displayed in the peripheral position of the first game role, so that the user may accurately and intuitively learn of the combat power of the first game role through directly viewing the combat power value around the game role in a battle screen without needing to open an information display panel, as required in the related art, and estimate an approximate combat ability of each hero role during the battle, to make a game decision quickly, thereby reducing unnecessary interaction operations of the user, and improving the efficiency of human-computer interaction between the battle client and the user.

Figure 3:
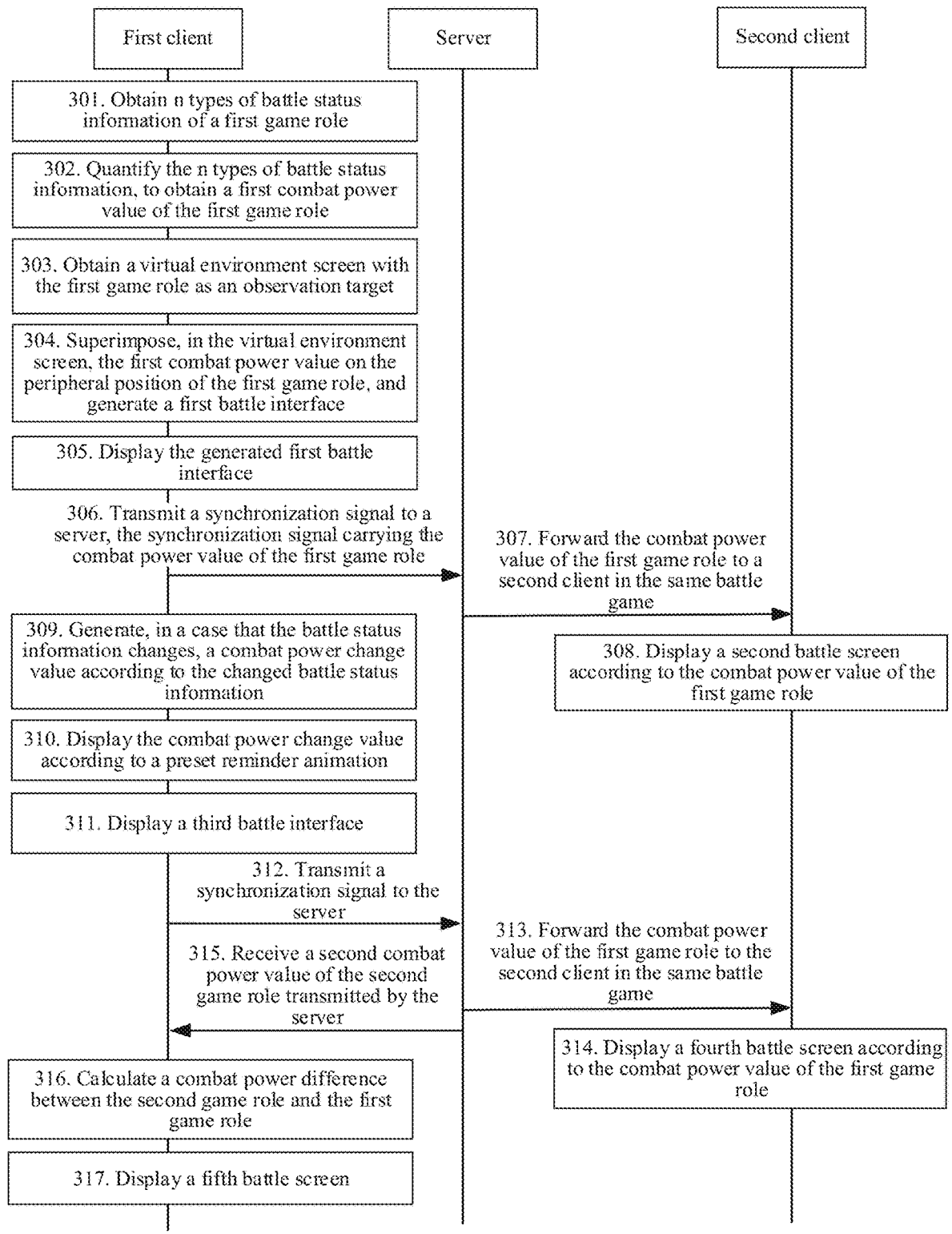
FIG. 3 is a schematic diagram of an information display method in a battle game according to an example embodiment of the disclosure.

FIG. 3 is a flowchart of an information display method in a battle game according to an example embodiment of the disclosure. This embodiment is described by using an example in which the method is applied to the game system 100 shown in FIG. 1. The method includes the following operations 301-317:

Operation 301. A first client obtains n types of battle status information of a first game role.

Optionally, the n types of battle status information include at least two types of information in a role level, an equipment attribute, a skill attribute, and a buff attribute of the first game role.

The first client is a battle game client run on the first terminal. A first user account logs in to the first client, and the first client is configured to control a first game role in a battle. Optionally, the first game role is a game role selected by a user from a plurality of game roles, or the first game role is a game role specified by the client.

Optionally, the battle status information of the first game role includes at least two of the following four types of information:

a role level of the first game role;

an equipment quantity and/or an equipment type owned by the first game role;

a skill type and a skill level owned by the first game role; and a buff type and a buff quantity owned by the first game role.

In this embodiment, an example in which the battle status information of the first game role includes the foregoing four types of information is used for illustrative purposes. However, this is merely an example provided for illustrative purposes only and the disclosure is not limited thereto.

Operation 302. The first client quantifies the n types of battle status information, to obtain a first combat power value of the first game role.

In this embodiment, the first combat power value of the first game role includes four parts (or four categories): a role level, an equipment attribute, a skill attribute, and a buff.

First combat power value=role level combat power+ equipment combat power+skill combat power+buff combat power.

Optionally, an initial battle value of the first game role may be 0 or another initial value calculated according to basic attributes. The combat power value of the first game role changes dynamically along with the battle status information. That is, the combat power value of the first game role dynamically increases or decreases along with the battle status information.

The first client multiplies the role level by a level combat power value in a case that the n types of battle status information include the role level, to obtain a role level combat power of the first game role; and obtains the first combat power value of the first game role through calculation according to the role level combat power. For example, role level combat power may be obtained by the following formula: role level combat power=e×hero level (or role level), where e represents an example of a variable representing an increase when the first game role is upgraded by one level.

The first client calculates, in a case that the n types of battle status information include the equipment quantity and the equipment type, an equipment combat power of the first game role according to the following formula:

$$\sum_{n=1}^{N}(L_{mn}*R_n*K_n);$$

and the first client obtains the first combat power value of the first game role through calculation according to the equipment combat power, N representing the equipment quantity owned by the first game role, $L_{mn}$ being an equipment fit factor in a case that the first game role owns equipment n, $R_n$ being a basic combat power bonus of the equipment n, and $K_n$ being a combat power attenuation coefficient in a case that the first game role owns a plurality pieces of the same equipment n at the same time.

The first client calculates, in a case that the n types of battle status information include the skill type and the skill level, a skill combat power of the first game role according to the following formula:

$$\sum_{i=1}^{K}(p_i*s_i+q_i*t_i);$$

and the first client obtains the first combat power value of the first game role through calculation according to the skill combat power, K being a skill quantity of the first game role, i being an ith skill in the K skills, $p_i$ being a boolean variable, $p_i=1$ representing that the first game role has learned the ith skill, $p_i=0$ representing that the first game role has not learned the ith skill, $s_i$ representing a combat power value obtained after the first game role has learned the ith skill, $q_i$ representing a level of the ith skill, and $t_i$ representing an increased combat power in a case that the ith skill is upgraded by one level.

The first client calculates, in a case that the n types of battle status information include the buff type and the buff quantity, a buff combat power of the first game role according to the following formula:

$$\sum_{p=1}^{P}(Y_{mp}*U_p),$$

P representing the buff quantity owned by the first game role, $U_p$ representing a basic combat power bonus of a pth buff, and $Y_{mp}$ representing a buff fit factor in a case that the first game role m owns the pth buff.

Operation 303. The first client obtains a virtual environment screen with the first game role as an observation target, the virtual environment screen being generated according to a virtual environment in which the first game role is located.

At least one of a two-dimensional (2D) virtual environment, a two-and-a-half-dimensional (2.5D) virtual environment, and a three-dimensional (3D) virtual environment is provided in the battle game. The 2.5D virtual environment is used as an example. The 2.5D virtual environment is provided with a map environment, and game roles play a battle in the map environment of the 2.5D virtual environment.

The first client obtains a virtual environment screen with the first game role as the observation target. Optionally, a first camera is disposed in the virtual environment, an observation target of the first camera is the first game role, and the first client obtains a virtual environment screen collected by the first camera.

Operation 304. The first client superimposes, in the virtual environment screen, the first combat power value on the peripheral position of the first game role, and generates a first battle interface.

Optionally, the peripheral position is a position above the head and/or a position below the foot of the first game role.

For example, the first client superimposes the first combat power value on the virtual environment screen, that is, superimposes the first combat power value on the position above the head of the first game role, and generates a first battle interface.

Optionally, the first client further superimposes other information and/or controls on the virtual environment screen. The other information and/or controls include at least one of, for example and not limited to: a role nickname of the first game role, a role level of the first game role, a health bar of the first game role, a control that controls the movement of the first game role in the virtual environment, a control that controls the release of the skill of the first game role in the virtual environment, teammate information, a mini-map control, game time, historical chat record information, and historical kill information.

Operation 305. The first client displays the generated first battle interface.

Figure 4:
FIG. 4 is a schematic diagram of an interface of an information display method in a battle game according to an example embodiment of the disclosure.

For example, referring to FIG. 4, a nickname "Rainbow" of the first game role, a level "9" of the first game role, and a combat power value "2158" of the first game role are displayed in the position above the head of the first game role.

Optionally, a display mode of the first combat power value is default. For example, a font style, a font size, and a background color (or a font color) of the first combat power value are all default values. In some embodiments, the background color of the first combat power value is yellow.

Operation 306. The first client transmits a synchronization signal to a server, the synchronization signal carrying the first combat power value of the first game role.

Because a plurality of clients join and play in the same battle game at the same time, in addition to the first client, other clients in the same battle game also need to display the first game role. Therefore, the first client forwards the first combat power value of the first game role to other clients in the same battle game through the server.

The server receives the first combat power value of the first game role from the first client.

Operation 307. The server forwards the first combat power value of the first game role to a second client in the same battle game.

The second client generally refers to a friendly client and/or an enemy client in the same battle game.

The second client receives the first combat power value of the first game role from the server.

Operation 308. The second client displays a second battle screen according to the first combat power value of the first game role, the second battle screen including the first game role and the first combat power value, the first combat power value being located in a peripheral position of the first game role.

The second client is a battle game client run on the second terminal. A second user account logs in to the second client, and the second client is configured to control a second game role in a battle. Optionally, the second game role is a game role selected by a second user from a plurality of game roles, or the second game role is a game role specified by the client.

The second client obtains a virtual environment screen with the second game role as an observation target. Optionally, the second client is provided with a second camera in the virtual environment, an observation target of the second camera is the second game role, and the second client obtains a virtual environment screen collected by the second camera.

Optionally, the virtual environment screen includes not only the second game role, but also the first game role. The second client superimposes, in the virtual environment screen, the first combat power value on the peripheral position of the first game role, and generates a second battle interface. Optionally, the peripheral position is a position above the head and/or a position below the foot of the first game role.

Optionally, the second client further superimposes other information and/or controls on the virtual environment screen. The other information and/or controls include at least one of, for example but not limited to: a role nickname of the first game role, a role level of the first game role, a health bar of the first game role, a role nickname of the second game role, a role level of the second game role, a health bar of the second game role, a control that controls the movement of the second game role in the virtual environment, a control that controls the release of the skill of the second game role in the virtual environment, teammate information, a mini-map control, game time, historical chat record information, and historical kill information.

Operation 309. The first client generates, in a case that the battle status information changes, a combat power change value according to the changed battle status information.

Because the battle status information includes at least two types of information, and any type of information may change, the first client further monitors a change of the battle status information at any time. In a case that the battle status information changes, a combat power change value is generated according to the changed battle status information.

Optionally, the first client calculates a real-time combat power value of the first game role by using the calculation method in the foregoing operation 302.

The first client further calculates the combat power change value of the first game role as follows:

Combat power change value=combat power value after the change−combat power value before the change.

Operation 310. The first client displays the combat power change value in a reminder animation mode.

Optionally, the reminder animation mode is an animation display mode in which the combat power change value is displayed in a peripheral position of the first game role according to a preset duration. Optionally, the reminder animation mode is also referred to as a floating character animation. The floating character animation is an animation in which the combat power change value is gradually added to the peripheral position of the first game role and displayed for several seconds, and then the combat power change value disappears in a fade-out mode.

For example, the several seconds are the preset duration in which the combat power change value is displayed in the animation display mode.

Figure 5:
FIG. 5 is a schematic diagram of an interface of an information display method in a battle game according to another example embodiment of the disclosure.

For example, referring to FIG. 5, a nickname "Rainbow" of the first game role is displayed in the position above the head of the first game role, and a combat power change value "+106D" is displayed below a health bar of the first game role. The combat power change value "+106D" is used for indicating that the combat power value of the first game role increases by 106 units.

Operation 311. The first client displays a third battle interface.

The third battle interface includes the first game role and the changed combat power value, and the changed combat power value is located in a peripheral position of the first game role.

Optionally, operation 310 and operation 311 are performed simultaneously.

Operation 312. The first client transmits a synchronization signal to the server.

The synchronization signal may be a frame synchronization signal, and the frame synchronization signal carries the combat power value of the first game role.

Correspondingly, the server receives the synchronization signal and obtains the combat power value of the first game role such as the combat power change value of the first game role from the synchronization signal.

Optionally, the server may further perform a consistency rule detection on the combat power value of the first game role. The consistency rule detection may also be referred to as a validity detection.

For example, the server detects whether a current change size of the total combat power change value meets a preset change value interval. When the change size meets the preset change value interval (that is, within the preset change value interval), it is determined that the current combat power change is valid; and when the change size exceeds the preset change value interval, it is determined that the current combat power change is invalid.

In another example, the synchronization signal includes: a total combat power change value Y and a changed combat power value X2. The server caches a combat power value X1 of the game role before the change. The server verifies whether a sum of the combat power value X1 before the change and the total combat power change value Y is consistent with the changed combat power value X2. If they are consistent, the combat power change is considered valid, that is, conforms to the consistency rule.

When the combat power change value of the first game role meets the preset change value interval (that is, determined to be valid), operation 313 is performed.

Operation 313. The server forwards the combat power value of the first game role to the second client in the same battle game.

The server may also transmit the combat power value of the first game role to the second client in the same battle game through preset signaling, where the preset signaling may be frame synchronization signaling.

Optionally, the second client is at least one of a friendly client, an enemy client, and an observer client.

Correspondingly, the second client receives the combat power value of the first game role, for example, the combat power change value of the first game role.

Operation 314. The second client displays a fourth battle screen according to the combat power value of the first game role, the fourth battle screen including the first game role and the changed combat power value, the changed combat power value being located in a peripheral position of the first game role.

The second client obtains a virtual environment screen with the second game role as an observation target. Optionally, the second client is provided with a second camera in the virtual environment, an observation target of the second camera is the second game role, and the second client obtains a virtual environment screen collected by the second camera.

Optionally, the virtual environment screen includes not only the second game role but also the first game role. The second client superimposes, in the virtual environment screen, the changed first combat power value on the peripheral position of the first game role, and generates a second battle interface. Optionally, the peripheral position is a position above the head and/or a position below the foot of the first game role.

Optionally, the second client further superimposes other information and/or controls on the virtual environment screen. The other information and/or controls include at least one of: a role nickname of the first game role, a role level of the first game role, a health bar of the first game role, a role nickname of the second game role, a role level of the second game role, a health bar of the second game role, a control that controls the movement of the second game role in the virtual environment, a control that controls the release of the skill of the second game role in the virtual environment, teammate information, a mini-map control, game time, historical chat record information, and historical kill information.

Operation 315. The first client receives a second combat power value of the second game role transmitted by the server.

Operation 316. The first client calculates a combat power difference between the second game role and the first game role.

The first client calculates a difference between the second combat power value and the first combat power value, and determines the difference as a combat power difference between the second game role and the first game role.

Operation 317. The first client displays a fifth battle screen, the fifth battle screen including the second game role and the second combat power value, and a display mode of the second combat power value corresponding to the combat power difference.

To clearly show the combat power difference between the first game role and the second game role, the first client may compare a total combat power of the first game role and that of the second game role, and dynamically change the display mode of the second combat power value of the second game role according to the combat power difference.

Optionally, the first client determines, according to a size relationship between the combat power difference and an interval threshold, the display mode of the second combat power value. The interval threshold is a critical value used for determining a size of the combat power difference.

Optionally, the display mode of the second combat power value includes: at least one of a font size, a font color, a font style, an animation mode, a background color (or a font color) and a border.

In this embodiment, for example, the display mode of the second combat power value is to superimpose the second combat power value on the background color for display. The second client displays a fifth battle interface, the fifth battle interface including the second game role and the second combat power value, the second combat power value being located in a peripheral position of the second game role, and the display mode of the second combat power value corresponding to the combat power difference. In some embodiments, second clients include only clients corresponding to enemy game roles. In some other embodiments, the second clients include clients corresponding to enemy game roles and clients corresponding to friendly game roles.

For example, in a case that the combat power difference is greater than a first interval threshold, the second combat power value has a first background color (or first font color); in a case that the combat power difference is greater than a second interval threshold and is less than the first interval threshold, the second combat power value has a second background color (or second font color); in a case that the combat power difference is greater than a third interval threshold and is less than the second interval threshold, the second combat power value has a third background color (or third font color); in a case that the combat power difference is greater than a fourth interval threshold and is less than the third interval threshold, the second combat power value has a fourth background color (or fourth font color); and in a case that the combat power difference is less than the fourth interval threshold, the second combat power value has a fifth background color (or fifth font color), the first interval threshold>the second interval threshold>the third interval threshold>the fourth interval threshold. Here, the combat power difference between the first game role and the second game role may not only include a positive difference value, but also include a negative difference value. For example, the combat power difference may be obtained by subtracting a combat power of the first game role from a combat power of the second game role.

In a schematic example, the combat power of the first game role is displayed in yellow. When a player observes a combat power of another player (e.g., the second game role), 5 different levels of colors are provided to distinguish a display mode of the another player, which helps the player to make a behavioral decision quickly. For example, the following scenarios may be possible.

1. When the combat power difference between the first game role and the second game role exceeds A (a specific value of A may be configured as appropriate), that is, the difference is excessively large, and the development of the enemy is much stronger than that of the first game role, a combat is not recommended, and the second combat power value is displayed in the first background color (for example, purple).

2. When the combat power difference between the first game role and the second game role exceeds B (a specific value of B may be configured as appropriate) and is less than A, that is, the enemy develops to be stronger than the first game role, high skills are needed to defeat the enemy, and the second combat power value is displayed in the second background color (for example, red).

3. When the combat power difference between the first game role and the second game role exceeds C (a specific value of C may be configured as appropriate) and is less than B, that is, the development of the enemy is similar to that of the first game role, the first and the second game roles may combat with similar strength, and the second combat power value is normally displayed in a default background color (for example, yellow).

4. When the combat power difference between the second game role and the first game role exceeds D (a specific value of D may be configured as appropriate) and is less than C, that is, the development of the enemy is weaker than that of the first game role, the second combat power value is displayed in the third background color (for example, green).

5. When the combat power difference between the second game role and the first game role exceeds E (a specific value of E may be configured as appropriate) and is less than D, that is, the development of the enemy is much weaker than that of the first game role, a direct combat is recommended, and the second combat power value is displayed in the fourth background color (for example, gray).

Figure 6:
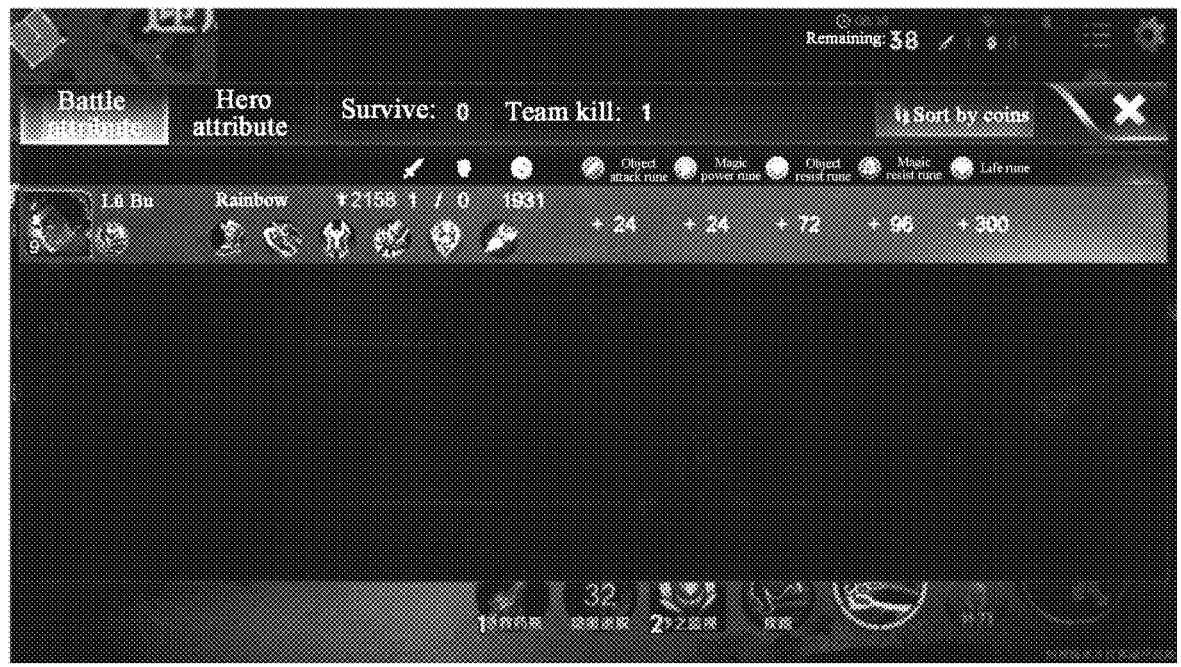
FIG. 6 is a schematic diagram of an interface of an information display method in a battle game according to still another example embodiment of the disclosure.

In some embodiments, considering the habits of some conventional players, a combat power value of each game role may also be displayed in an information display interface and a settlement interface after each battle game ends. For example, referring to FIG. 6, a combat power value "2158" of the first game role "Rainbow" is displayed in the information display interface.

As described above, according to the method provided in this embodiment, the battle status information of the first game role is quantified to obtain the combat power value of the first game role, and the combat power value is displayed in the peripheral position of the first game role, so that the user may accurately and intuitively learn of the combat power of the first game role through directly viewing the combat power value around the game role in a battle screen without needing to open an information display panel and estimate an approximate combat ability of each hero role during the battle, to make a game decision quickly, thereby reducing unnecessary interaction operations of the user, and improving the efficiency of human-computer interaction between the battle game client and the user.

According to the method provided in this embodiment, the display mode (for example, the background color of the combat power value) of the second combat power value of the second game role is dynamically determined according to the combat power difference between the second game role and the first game role, so that the user may quickly learn of the combat power difference between the enemy game role and the game role of the user according to the display mode of the second combat power value, to quickly decide whether to combat and/or avoid the combat (e.g., hide), thereby improving the efficiency of human-computer interaction between the user and the client.

Figure 7:
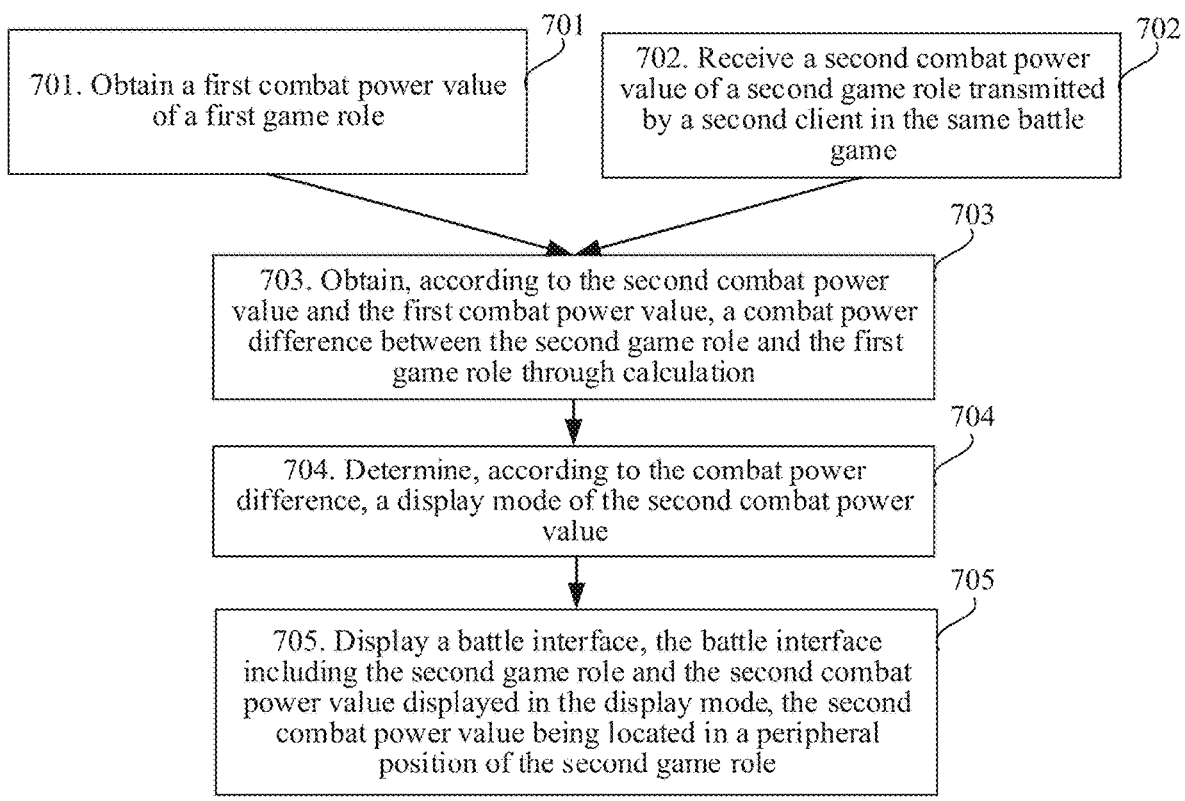
FIG. 7 is a schematic diagram of an information display method in a battle game according to another example embodiment of the disclosure.

FIG. 7 is a flowchart of an information display method in a battle game according to another embodiment of the disclosure. In this embodiment, an example in which the method is applied to the first terminal 120 in FIG. 1 is used for illustrative purposes. A first client (or referred to as a first game client) is run on the first terminal. The method includes the following operations 701-705:

Operation 701. Obtain a first combat power value of a first game role.

The first game role is a game role controlled by the first client, that is, a game role controlled by a user.

Optionally, the first combat power value is a comprehensive combat power index obtained through quantification according to the n types of battle status information of the first game role. The n types of battle status information of the first game role include information related to a combat power of the first game role.

Operation 702. Receive a second combat power value of a second game role transmitted by a second client in the same battle game.

The second game role is a game role controlled by the second client. The second client generally refers to an enemy client and/or a friendly client in the same battle game.

Optionally, the second combat power value is a comprehensive combat power index obtained through quantification according to the n types of battle status information of the second game role. The n types of battle status information of the second game role include information related to a combat power of the second game role.

Operation 703. Obtain, according to the second combat power value and the first combat power value, a combat power difference between the second game role and the first game role through calculation.

The first client subtracts the first combat power value from the second combat power value, or subtracts the second combat power value from the first combat power value, to obtain the combat power difference between the second game role and the first game role.

Optionally, in this embodiment, an example in which the combat power difference is a difference obtained by subtracting the first combat power value from the second combat power value is used for illustrative purposes, but this is not limited.

Operation 704. Determine, according to the combat power difference, a display mode of the second combat power value.

Optionally, the display mode of the second combat power value includes: at least one of a font size, a font color, a font style, an animation mode, a background color and a border.

Optionally, different combat power differences correspond to different display modes of the second combat power value. In some embodiments, for the combat power difference, a plurality of difference intervals are provided. Different difference intervals correspond to different display modes. In other words, each difference interval corresponds to its own display mode.

In this embodiment, an example in which the display mode of the second combat power value includes the background color is used for illustrative purposes.

Operation 705. Display a battle interface, the battle interface including the second game role and the second combat power value displayed in the display mode, the second combat power value being located in a peripheral position of the second game role.

Optionally, the peripheral position of the second game role is a position above the head or a position below the foot of the second game role. When the position above the head of the second game role includes a nickname and a health bar (e.g., health point) of the role, the peripheral position may be a position below a health bar of the role. Optionally, the second combat power value may move along with the second game role, that is, a display position of the second combat power value is fixed relative to that of the second game role. The display mode of the second combat power value corresponds to the combat power difference, so that the user may quickly learn of the combat power difference between the first game role and the second game role according to the display mode of the second combat power value, to quickly make a game decision.

In some embodiments, the battle interface further includes the first game role and the first combat power value, the first combat power value being located in a peripheral position of the first game role. A display mode of the first combat power value is default or fixed.

According to the method provided in this embodiment, the first combat power value of the first game role and the second combat power value of the second game role are obtained, the combat power difference between the second game role and the first game role is obtained through calculation, and after the display mode of the second combat power value is determined according to the combat power difference, the second combat power value is displayed in the peripheral position of the second game role in the display mode, so that the user may accurately and intuitively learn of the combat power of the second game role (e.g., an enemy hero) through directly viewing the combat power value around the second game role in a battle screen without needing to open an information display panel and estimate an approximate combat ability of each game role during the battle, to make a game decision quickly, thereby reducing unnecessary interaction operations of the user, and improving the efficiency of human-computer interaction between the battle client and the user.

Figure 8:
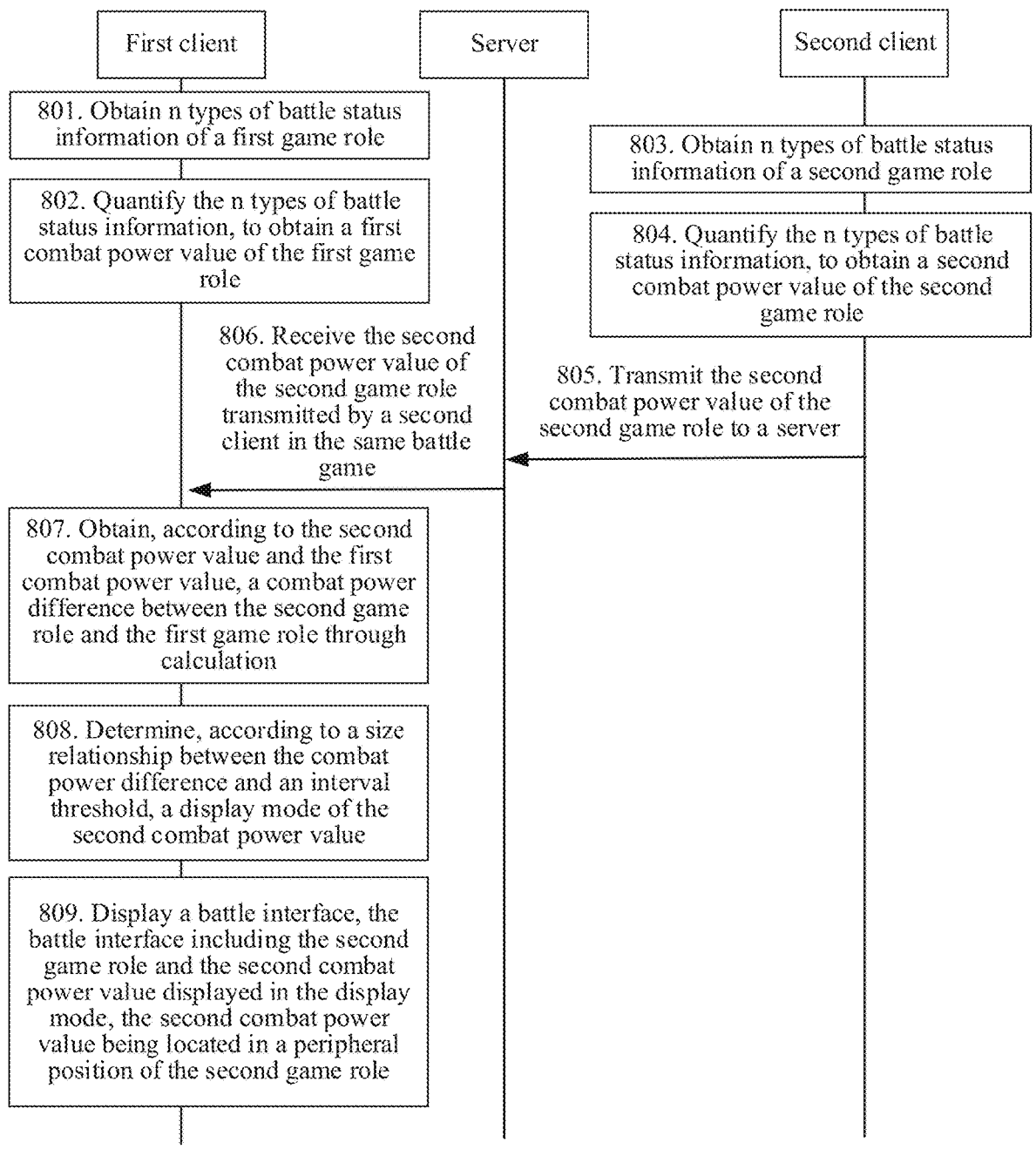
FIG. 8 is a schematic diagram of an information display method in a battle game according to still another example embodiment of the disclosure.

FIG. 8 is a flowchart of an information display method in a battle game according to another embodiment of the disclosure. In this embodiment, an example in which the method is applied to the game system 100 in FIG. 1 is used for illustrative purposes. A first client (or referred to as a first game client) is run on the first terminal. A second client (or referred to as a second game client) is run on the second terminal. The method includes the following operations 801-809:

Operation 801. The first client obtains n types of battle status information of a first game role.

Optionally, the n types of battle status information include at least two types of information in a role level, an equipment attribute, a skill attribute, and a buff attribute of the first game role.

The first client is a battle game client run on the first terminal. A first user account logs in to the first client, and the first client is configured to control a first game role in a battle. Optionally, the first game role is a game role selected by a user from a plurality of game roles, or the first game role is a game role specified by the client.

Optionally, the battle status information of the first game role includes at least two of the following four types of information:

a role level of the first game role;

an equipment quantity and/or an equipment type owned by the first game role;

a skill type and a skill level owned by the first game role; and a buff type and a buff quantity owned by the first game role.

In this embodiment, an example in which the battle status information of the first game role includes the foregoing four types of information is used for illustrative purposes.

Operation 802. The first client quantifies the n types of battle status information, to obtain a first combat power value of the first game role.

In this embodiment, the first combat power value of the first game role includes four parts: a role level, an equipment attribute, a skill attribute, and a buff.

First combat power value=role level combat power+equipment combat power+skill combat power+buff combat power.

Optionally, an initial battle value of the first game role may be 0 or another initial value calculated according to basic attributes. The combat power value of the first game role changes dynamically along with the battle status information. That is, the combat power value of the first game role dynamically increases or decreases along with the battle status information.

The first client multiplies the role level by a level combat power value in a case that the n types of battle status information include the role level, to obtain a role level combat power of the first game role; and obtains the first combat power value of the first game role through calculation according to the role level combat power. For example, role level combat power=e×hero level, where e represents an example variable representing an increase when the first game role is upgraded by one level.

The first client calculates, in a case that the n types of battle status information include the equipment quantity and the equipment type, an equipment combat power of the first game role according to the following formula:

$$\sum_{n=1}^{N}(L_{mn}*R_{n}*K_{n});$$

and the first client obtains the first combat power value of the first game role through calculation according to the equipment combat power, N representing the equipment quantity owned by the first game role, $L_m$ being an equipment fit factor in a case that the first game role owns equipment n, $R_n$ being a basic combat power bonus of the equipment n, and $K_n$ being a combat power attenuation coefficient in a case that the first game role owns a plurality pieces of the same equipment n at the same time.

The first client calculates, in a case that the n types of battle status information include the skill type and the skill level, a skill combat power of the first game role according to the following formula:

$$\sum_{i=1}^{K}(p_i*s_i+q_i*t_i);$$

and the first client obtains the first combat power value of the first game role through calculation according to the skill combat power, K being a skill quantity of the first game role, i being an ith skill in the K skills, $p_i$ being a boolean variable, $p_i=1$ representing that the first game role has learned the ith skill, $p_i=0$ representing that the first game role has not learned the ith skill, $s_i$ representing a combat power value obtained after the first game role has learned the ith skill, $q_i$ representing a level of the ith skill, and $t_i$ representing an increased combat power in a case that the ith skill is upgraded by one level.

The first client calculates, in a case that the n types of battle status information include the buff type and the buff quantity, a buff combat power of the first game role according to the following formula:

$$\sum_{p=1}^{P}(Y_{mp}*U_p),$$

P representing the buff quantity owned by the first game role, and $U_p$ representing a basic combat power bonus of a pth buff.

Optionally, when at least one of the n types of battle status information of the first game role changes, the first client calculates the changed first combat power value in real time.

Operation 803. The second client obtains n types of battle status information of a second game role.

Optionally, the n types of battle status information include at least two types of information in a role level, an equipment attribute, a skill attribute, and a buff attribute of the second game role.

The second client is a battle game client run on the second terminal. A second user account logs in to the second client, and the second client is configured to control a second game role in a battle. Optionally, the second game role is a game role selected by a user from a plurality of game roles, or the second game role is a game role specified by the client.

Optionally, the battle status information of the second game role includes at least two of the following four types of information:

a role level of the second game role;

an equipment quantity and/or an equipment type owned by the second game role;

a skill type and a skill level owned by the second game role; and a buff type and a buff quantity owned by the second game role.

In this embodiment, an example in which the battle status information of the second game role includes the foregoing four types of information is used for illustrative purposes.

Operation 804. The second client quantifies the n types of battle status information, to obtain a second combat power value of the second game role.

In this embodiment, the second combat power value of the second game role includes four parts: a role level, an equipment attribute, a skill attribute, and a buff.

Second combat power value=role level combat power+equipment combat power+skill combat power+buff combat power.

Optionally, an initial battle value of the second game role may be 0 or another initial value calculated according to basic attributes. The combat power value of the second game role changes dynamically along with the battle status information. That is, the combat power value of the second game role dynamically increases or decreases along with the battle status information.

Optionally, the calculation method of the second combat power value is the same as the foregoing calculation method of the first combat power value, and details are not described in this operation.

Optionally, when at least one of the n types of battle status information of the second game role changes, the second client calculates the changed second combat power value in real time.

Operation 805. The second client transmits the second combat power value of the second game role to a server.

Correspondingly, the server receives the second combat power value of the second game role. In some embodiments, when the second combat power value of the second game role changes, the second client may transmit a combat power change value or the changed second combat power value to the server, and then the server receives the combat power change value or the changed second combat power value of the second game role.

Optionally, the server may further perform a consistency rule detection on the second combat power value of the second game role. When the second combat power value meets the consistency rule, the second combat power value of the second game role is forwarded to the first client in the same battle game.

Operation 806. The first client receives the second combat power value of the second game role transmitted by the second client in the same battle game.

Operation 807. The first client obtains, according to the second combat power value and the first combat power value, a combat power difference between the second game role and the first game role through calculation.

The first client subtracts the first combat power value from the second combat power value, or subtracts the second combat power value from the first combat power value, to obtain the combat power difference between the second game role and the first game role.

Optionally, in this embodiment, an example in which the combat power difference is a difference obtained by subtracting the first combat power value from the second combat power value is used for illustrative purposes, but this is not limited.

Operation 808. The first client determines, according to a size relationship between the combat power difference and an interval threshold, a display mode of the second combat power value.

Optionally, the display mode of the second combat power value includes: at least one of a font size, a font color, a font style, an animation mode, a background color (or a font color) and a border. Optionally, the interval threshold is a critical value used for determining a size of the combat power difference.

Optionally, different combat power differences correspond to different display modes of the second combat power value. In some embodiments, for the combat power difference, a plurality of difference intervals are provided. Different difference intervals correspond to different display modes. In other words, each difference interval corresponds to its own display mode.

Optionally, for example, the display mode of the second combat power value includes the background color (or the font color). This operation includes:

determining, in a case that the combat power difference is greater than a first interval threshold, that the second combat power value uses a first background color;

determining, in a case that the combat power difference is greater than a second interval threshold and is less than the first interval threshold, that the second combat power value uses a second background color;

determining, in a case that the combat power difference is greater than a third interval threshold and is less than the second interval threshold, that the second combat power value uses a third background color;

determining, in a case that the combat power difference is greater than a fourth interval threshold and is less than the third interval threshold, that the second combat power value uses a fourth background color; and determining, in a case that the combat power difference is less than the fourth interval threshold, that the second combat power value has a fifth background color, the first interval threshold>the second interval threshold>the third interval threshold>the fourth interval threshold.

Operation 809. The first client displays a battle interface, the battle interface including the second game role and the second combat power value displayed in the display mode, the second combat power value being located in a peripheral position of the second game role.

Optionally, the peripheral position of the second game role is a position above the head or a position below the foot of the second game role. When the position above the head of the second game role includes a nickname and a health bar (e.g., including a health point) of the role, the peripheral position may be a position below a health bar of the role. Optionally, the second combat power value will move along with the second game role, that is, a display position of the second combat power value is fixed relative to that of the second game role. The display mode of the second combat power value corresponds to the combat power difference, so that the user may quickly learn of the combat power difference between the first game role and the second game role according to the display mode of the second combat power value, to quickly make a game decision.

In some embodiments, the battle interface further includes the first game role and the first combat power value, the first combat power value being located in a peripheral position of the first game role. A display mode of the first combat power value is default or fixed.

In a schematic example, the combat power of the first game role is displayed in yellow. When a player observes a combat power of another player, 5 different levels of colors are provided to distinguish, which helps the player to make a behavioral decision quickly.

1. When the combat power difference between the first game role and the second game role exceeds A (a specific value of A may be configured as appropriate), that is, the difference is excessively large, and the development of the enemy is much stronger than that of the first game role, a combat is not recommended, and the second combat power value is displayed in the first background color (for example, purple).

2. When the combat power difference between the first game role and the second game role exceeds B (a specific value of B may be configured as appropriate) and is less than A, that is, the enemy develops to be stronger than the first game role, high skills are needed to defeat the enemy, and the second combat power value is displayed in the second background color (for example, red).

3. When the combat power difference between the first game role and the second game role exceeds C (a specific value of C may be configured as appropriate) and is less than B, that is, the development of the enemy is similar to that of the first game role, the first and the second game roles may combat with similar strength, and the second combat power value is normally displayed in a default background color (for example, yellow).

4. When the combat power difference between the second game role and the first game role exceeds D (a specific value of D may be configured as appropriate) and is less than C, that is, the development of the enemy is weaker than that of the first game role, the second combat power value is displayed in the third background color (for example, green).

5. When the combat power difference between the second game role and the first game role exceeds E (a specific value of E may be configured as appropriate) and is less than D, that is, the development of the enemy is much weaker than that of the first game role, a direct combat is recommended, and the second combat power value is displayed in the fourth background color (for example, gray).

Thus, according to the method provided in this embodiment, the first combat power value of the first game role and the second combat power value of the second game role are obtained, the combat power difference between the second game role and the first game role is obtained through calculation, and after the display mode of the second combat power value is determined according to the combat power difference, the second combat power value is displayed in the peripheral position of the second game role in the display mode, so that the user may accurately and intuitively learn of the combat power of the second game role (e.g., an enemy hero) through directly viewing the combat power value around the second game role in a battle screen without needing to open an information display panel and estimate an approximate combat ability of each game role during the battle, to make a game decision quickly, thereby reducing unnecessary interaction operations of the user, and improving the efficiency of human-computer interaction between the battle client and the user.

In a typical MOBA game, each user account controls a hero. The hero is a game role that has a better ability than that of roles such as creeps and monsters in the MOBA game. A combat ability of each hero is related to four factors: a level of the hero, equipment owned by the hero, a skill and a skill level owned by the hero, and a buff effect obtained by the hero.

Figure 9:
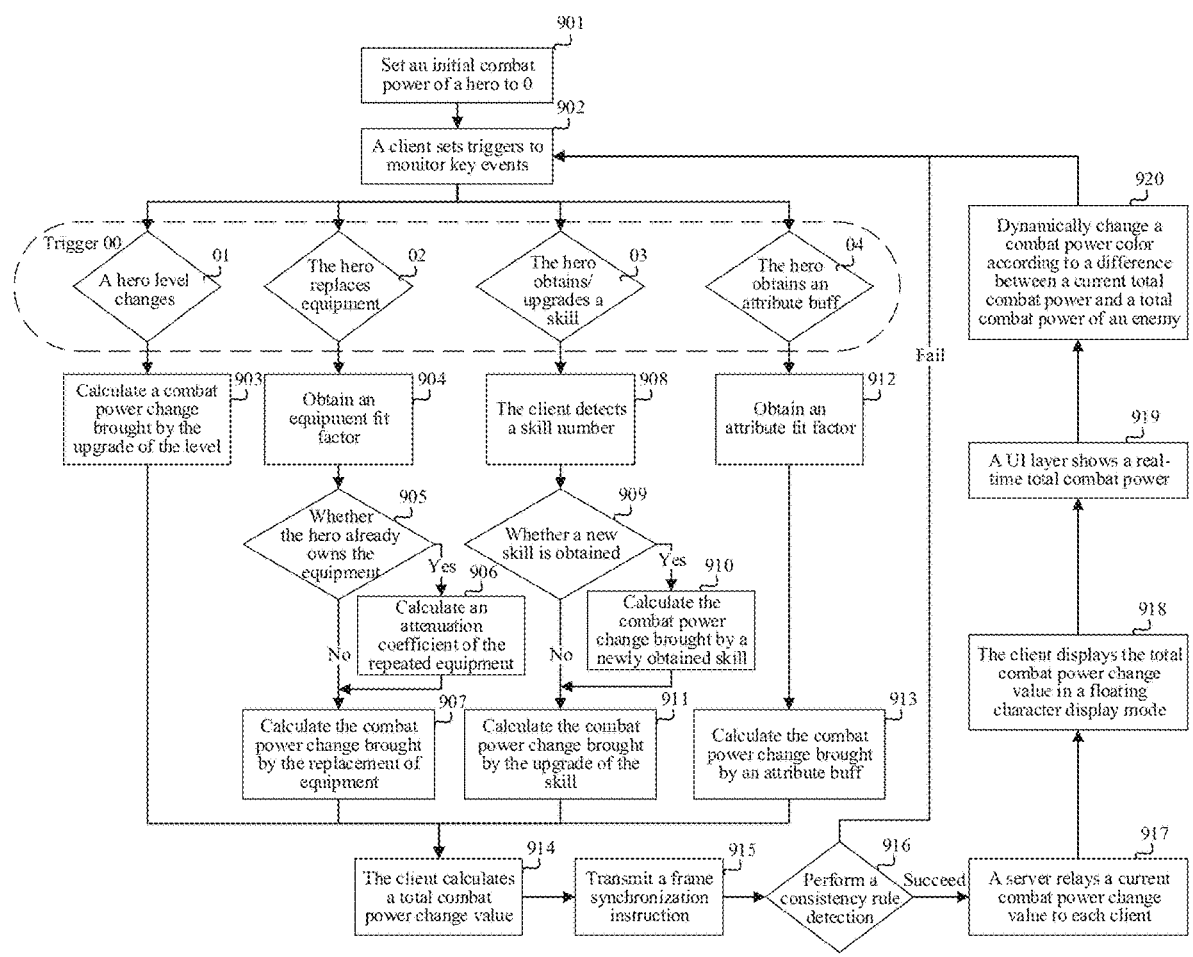
FIG. 9 is a schematic diagram of an information display method in a battle game according to still yet another example embodiment of the disclosure.

FIG. 9 is a flowchart of displaying a combat power of a hero in real time in a MOBA game. As shown in FIG. 9, the method includes the following operations 901-920.

Operation 901. A client sets an initial combat power of a hero to 0.

When a battle begins, the client sets the initial combat power of the hero controlled by a current user account to 0. In this case, the hero has an initial hero level of 0, owns empty initial equipment and empty initial skills, and obtains no buff effect.

Operation 902. The client sets triggers to monitor key events.

The client sets four triggers for the hero:

1. A trigger 01 configured to monitor a hero level change is set.

A hero has its own hero level system. In some embodiments, a hero may be upgraded up to level 15. When a battle begins, an initial hero level of a hero is 0. Each hero level corresponds to its own level interval threshold. When a hero kills a monster, a creep, or an enemy-controlled hero, the hero gains an experience value. When the experience value reaches a level interval threshold of a specific level x, a hero level of the hero is upgraded.

Therefore, the client sets the trigger 01 for the hero, and the trigger 01 is configured to monitor the hero level change of the hero.

2. A trigger 02 configured to monitor a replacement of equipment of the hero is set.

The game system is further provided with an equipment mechanism. Various equipment has the capability of enhancing one or more attributes of the hero. The attribute includes, for example, at least one of a health point, a health recovery rate, a magic point, a magic recovery rate, a defensive power, an armor point, an attack power, a health point (HP) absorption ability, a deceleration ability, a one-time health recovery ability, an ability to resist fatal damage, and a resurrection ability.

When a hero kills a monster, a creep, or an enemy-controlled hero, the hero obtains virtual money. The virtual money may be used for purchasing various equipment from the system. Alternatively, the hero may move in the game system, and when randomly encountering equipment during the movement, the hero picks up and owns the equipment. Alternatively, the hero may open a treasure chest in the game system to pick up and own the equipment in the treasure chest.

Therefore, the client sets the trigger 02 for the hero, and the trigger 02 is configured to monitor the change of equipment owned by the hero.

3. A trigger 03 configured to monitor obtaining/upgrade of a skill of the hero is set.

The game system is further provided with a hero skill mechanism, which may be briefly referred to as a skill. A hero may have several skills, for example, a hero may have 3 skills, 4 skills or 5 skills, and each skill also corresponds to its own skill level. In this embodiment, an example in which a hero has three skills is used, and each skill corresponds to one of four levels. For example, an initial state of each skill is a first level, and each time the hero level of the hero is upgraded by one level, the user may choose to upgrade one of the three skills by one level (that is, a level of one of the three skills increases).

Therefore, the client sets the trigger 03 for the hero, and the trigger 03 is configured to monitor the skill level change of the skill owned by the hero.

4. A trigger 04 configured to monitor obtaining of an attribute buff of the hero is set.

The game system is further provided with a buff mechanism. For example, two types of buff are provided: blue buff and red buff. The blue buff has an effect of accelerating the magic point recovery rate of the hero and reducing a cooling time of the skill by 20%, and may be obtained by the hero by killing a neutral wild monster (e.g., "blue statue"). The red buff has an effect of deceleration and continuous damage, and may be obtained by the hero by killing a neutral wild monster (e.g., "red statue").

Therefore, the client sets the trigger 04 for the hero, and the trigger 04 is configured to monitor the buff change corresponding to the hero.

Operation 903. When the trigger 01 is triggered, the client calculates a combat power change brought by the upgrade of the level.

Each time the hero level is upgraded, one or more of basic attributes such as a health point, a magic point, an attack power, and a defensive power of the hero may be improved. Therefore, when the trigger 01 is triggered, the client calculates a combat power change value of the hero according to changes of a basic attribute value of the hero before and after the upgrade of the hero level. The combat power change value may be a combat power increased value.

That is, in this operation, combat power change value=combat power value after the hero level changes—combat power value before the hero level changes.

For example, after a hero level of a hero "Arthur" is upgraded to a level 12, the client calculates that a combat power of the hero "Arthur" is 2400 when the hero level is 12 and the combat power is 2189 when the hero level is 11 before the change, so that a combat power change value of the hero "Arthur" is 2400−2189=211.

After the combat power change is calculated, operation 914 is performed.

Operation 904. When the trigger 02 is triggered, the client obtains an equipment fit factor.

Different heroes may have different hero positions, for example, a powerful hero, an agile hero, a magic hero, an output hero, and a support hero; and in another example, a top hero, a middle hero, a jungle hero, an ADC hero, and a support hero. Each piece of equipment may improve only one or two attributes, for example, one piece of equipment is configured to improve an attack power, another piece of equipment is configured to improve a defensive power, and another piece of equipment is configured to improve a magic recovery rate. Therefore, when the same equipment is owned by different heroes, the improvements of the combat powers of the heroes are different. In this embodiment, an equipment fit factor $L_{mn}$ is introduced, which represents a bonus actually obtained by a hero m after the hero m obtains a piece of equipment n.

Optionally, a plurality of equipment fit factors $L_{mn}$ are pre-stored in the client. Optionally, a total quantity of equipment fit factors $L_{mn}$ is equal to a product of a total quantity of heroes and a total quantity of equipment. The plurality of equipment fit factors $L_{mn}$ may be stored in the form of a data table, or may be stored in the form of a database.

Operation 905. Determine whether the hero already owns the equipment.

The hero may also purchase a plurality of pieces of equipment of the same type. For example, there is a piece of equipment "nightmare" that enhances all attributes. The same hero may purchase two or three "nightmares". When the hero owns a new piece of equipment, the client may detect whether the hero already owns the equipment.

When the hero already owns the equipment, operation 906 is performed; and when the hero does not own the equipment, operation 907 is performed.

Operation 906. When the hero already owns the equipment, the client calculates an attenuation coefficient of the repeated equipment.

When the hero owns a plurality of pieces of repeated equipment, buffs of the plurality of pieces of repeated equipment may be directly added together. Each time the hero owns a piece of new repeated equipment, the client may calculate an attenuation coefficient of the repeated equipment. For example, the attenuation coefficient is inversely proportional to a quantity of repeated equipment owned by the client. For example, each time the hero owns a piece of repeated equipment, the attenuation coefficient is 15%. If the hero owns the equipment for the first time, the buff effect is 100%; if the hero owns the equipment for the second time, the buff effect is 85%; if the hero owns the equipment for the third time, the buff effect is 70%; if the hero owns the equipment for the fourth time, the buff effect is 55%, and so on. Details are not described herein again. For example, each hero may have up to 6 pieces of finished equipment, and therefore, the buff effect cannot fall below 0%.

Operation 907. The client calculates the combat power change brought by the replacement of equipment.

The client calculates the combat power change when the hero owns the equipment based on the equipment fit factor corresponding to the hero and the equipment, and the attenuation coefficient of the repeated equipment.

That is, in this operation, combat power change value=combat power value after the hero owns the equipment−combat power value before the hero owns the equipment.

After the combat power change is calculated, operation 914 is performed.

Operation 908. When the trigger 03 is triggered, the client detects a skill number.

Each time the hero level is upgraded, the user has an opportunity to upgrade a skill of the hero (which may have 3 or 4 skills at the same time). When the user upgrades a skill of the hero, the trigger 03 will be triggered.

Because the same hero may have 3 or 4 skills, the client needs to obtain a skill number of a skill to be upgraded this time. Optionally, for example, the hero "Arthur" owns 3 skills, and skill numbers of the skills are respectively 01, 02, and 03. If the skill obtained/upgraded this time is a first skill, the skill number is 01; if the skill obtained/upgraded this time is a second skill, the skill number is 02; and if the skill obtained/upgraded this time is a third skill, the skill number is 03.

Operation 909. The client detects whether a new skill is obtained.

The client detects whether the skill change this time is to obtain a new skill or upgrade an obtained skill.

When the skill change this time is to obtain a new skill, operation 910 is performed; and when the skill change this time is to upgrade an obtained skill, operation 911 is performed.

Operation 910. The client calculates the combat power change brought by a newly obtained skill.

When the hero obtains a new skill, not only the skill combat power of the skill itself increases, but also a sum of combat powers when the skill is combined with another existing skill increases, thereby increasing the combat power of the hero. Therefore, when the hero obtains a new skill, the client may calculate the combat power change brought by the newly obtained skill to the hero.

In this operation, combat power change value=combat power value after the new skill is obtained−combat power value before the new skill is obtained.

After the combat power change is calculated, operation 914 is performed.

Operation 911. The client calculates the combat power change brought by the upgrade of the skill.

When a skill of the hero is upgraded, the client may calculate an increased value of the combat power brought by the upgrade of the skill to the hero.

In this operation, combat power change value=combat power value after the skill is upgraded−combat power value before the skill is upgraded.

After the combat power change is calculated, operation 914 is performed.

Operation 912. When the trigger 04 is triggered, the client obtains an attribute fit factor.

Corresponding to the equipment fit factor, different attribute buffs are different for different heroes. Therefore, the client may introduce an attribute fit factor Ymn, and the attribute fit factor Ymn represents a bonus actually obtained by a hero m after the hero m obtains an attribute n.

Optionally, a plurality of attribute fit factors Ymn are pre-stored in the client. Optionally, a total quantity of attribute fit factors Ymn is equal to a product of a total quantity of heroes and a total quantity of attribute buffs. The plurality of attribute fit factors Ymn may be stored in the form of a data table, or may be stored in the form of a database.

Operation 913. The client calculates the combat power change brought by an attribute buff.

Optionally, after the hero obtains an attribute buff, the combat power change brought by the attribute buff to the hero is calculated.

In this operation, combat power change value=combat power value after the buff is obtained−combat power value before the buff is obtained.

Operation 914. The client calculates a total combat power change value.

In a MOBA game, a combat power of a hero includes four parts: a hero level, equipment, a skill level, and an attribute buff.

Total combat power=hero level combat power+equipment combat power+skill combat power+attribute buff combat power.

One of the foregoing four combat powers may change, or several of the foregoing four combat powers may change at the same time. For example, when the hero level is upgraded, a new skill may be obtained or an existing skill may be upgraded, that is, the hero level combat power and the skill combat power are upgraded at the same time. Therefore, the client needs to calculate the total combat power change value.

Operation 915. The client transmits a frame synchronization instruction to a server.

After calculating the current total combat power change value of the hero, the client transmits a frame synchronization instruction to a server. The frame synchronization instruction carries the total combat power change value.

Correspondingly, the server receives the frame synchronization instruction transmitted by the client.

Operation 916. The server performs a consistency rule detection.

The server obtains the total combat power change value from the frame synchronization instruction, and then performs the consistency rule detection on the total combat power change value. The consistency rule detection may be regarded as a validity detection.

For example, the server detects whether the current change size of the total combat power change value meets a preset change value interval. When the change size meets the preset change value interval, it is determined that the current combat power change is valid; and when the change size exceeds the preset change value interval, it is determined that the current combat power change is invalid.

In another example, the frame synchronization instruction includes: a total combat power change value Y and a changed combat power value X2. The server caches a combat power value X1 of the hero before the change. The server verifies whether a sum of the combat power value X1 before the change and the total combat power change value Y is consistent with the changed combat power value X2. If the values X1 and Y are consistent with the value X2, the combat power change is considered valid and conforms to the consistency rule.

When the change size of the combat power is within the preset change value interval, operation 917 is performed. Otherwise, the process is terminated.

Operation 917. The server relays a current combat power change value to each client.

The server relays the current combat power change value of the hero to each client in the same battle. Each client may operate one or more heroes. Optionally, when some clients access as an observer, the client does not need to operate any hero, and only watches the process of the battle as an observer.

Each client in the battle will receive the current combat power change value of the hero sent by the server.

Operation 918. The client displays the total combat power change value in a floating character display mode.

After receiving the current combat power change value of the hero, the client may display the total combat power change value in a floating character display mode.

Optionally, if the total combat power change value is +120, the client displays characters "+120" in a gradual manner below a health bar of the hero, and the characters "+120" are displayed in a floating manner for 1 second, and disappears in a fade-out mode and will no longer be displayed.

Operation 919. A user interface (UI) layer shows a real-time total combat power.

When a hero appears on a UI screen of the client, the client displays a real-time total combat power of each hero below a health bar of the hero continuously and in real time.

Operation 920. The client dynamically changes a combat power color according to a difference between a current total combat power and a total combat power of an enemy.

To clearly show a combat power difference between a subject hero (or the first game role) and an enemy hero (or the second game role), the client will compare a total combat power of the subject hero and that of the enemy hero, and dynamically change a combat power color of the enemy hero according to a comparison result. Optionally, the combat power color is a background color (or a font color) when the combat power value corresponding to the enemy hero is displayed.

In a schematic example, the combat power of the subject hero is displayed in yellow. When a player observes a combat power of another player, 5 different levels of colors are provided to distinguish, which helps the player to make a behavioral decision quickly.

1. When the combat power difference between subject hero and the enemy hero exceeds A (a specific value of A may be configured as appropriate), that is, the difference is excessively large, and the development of the enemy is much stronger than that of the subject hero, a combat is not recommended, and the combat power of the enemy hero is displayed in purple, for example.

2. When the combat power difference between the subject hero and the enemy hero exceeds B (a specific value of B may be configured as appropriate) and is less than A, that is, the enemy develops to be stronger than the subject hero, high skills are needed to defeat the enemy, and the combat power of the enemy hero is displayed in red, for example.

3. When the combat power difference between the subject hero and the enemy hero exceeds C (a specific value of C may be configured as appropriate) and is less than B, that is, the development of the enemy is similar to that of the subject hero, the first and the second game roles may combat with similar strength, and the combat power of the enemy hero is normally displayed in yellow, for example.

4. When the combat power difference between the enemy hero and the subject hero exceeds D (a specific value of D may be configured as appropriate) and is less than C, that is, the development of the enemy is weaker than that of the subject hero, the combat power of the enemy hero is displayed in green, for example.

5. When the combat power difference between the enemy hero and the subject hero exceeds E (a specific value of E may be configured as appropriate) and is less than D, that is, the development of the enemy is much weaker than that of the subject hero, a direct combat is recommended, and the combat power of the enemy hero is displayed in gray, for example.

Apparatus embodiments of the disclosure are described below. Reference may be made to the foregoing method embodiments for details that are not described in detail in the apparatus embodiments. Because the foregoing method embodiments and the following apparatus embodiments correspond to each other, the two may refer to each other.

Figure 10:
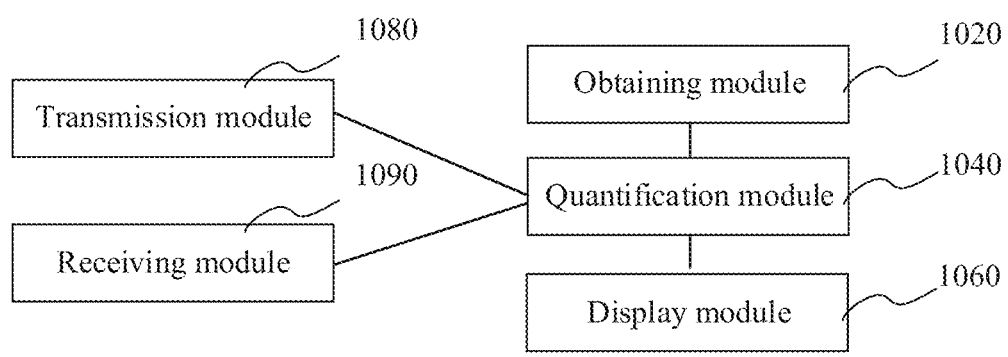
FIG. 10 is a block diagram of an information display apparatus in a battle game according to an example embodiment of the disclosure.

FIG. 10 is a block diagram of an information display apparatus in a battle game according to an example embodiment of the disclosure. The apparatus may be implemented as the entire or a part of a first terminal or a second terminal by means of software, hardware, or a combination of software and hardware. The apparatus includes:

an obtaining module 1020, configured to obtain n types of battle status information of the first game role, the n types of battle status information including information related to a combat power of the first game role;

a quantification module 1040, configured to quantify the n types of battle status information, to obtain a first combat power value of the first game role; and a display module 1060, configured to display a first battle interface, the first battle interface including the first game role (or a display object corresponding to the first game role) and the first combat power value, the first combat power value being located in a peripheral position of the first game role.

In an optional embodiment, the display module 1060 is configured to: obtain a virtual environment screen with the first game role as an observation target, the virtual environment screen being generated according to a virtual environment in which the first game role is located; and superimpose the first combat power value on the peripheral position of the first game role, and generate and display the first battle interface.

In an optional embodiment, the n types of battle status information include at least two of the following four types of information:

a role level of the first game role;

an equipment quantity and an equipment type owned by the first game role;

a skill type and a skill level owned by the first game role; and a buff type and a buff quantity owned by the first game role;

the combat power value being a comprehensive combat power index obtained through quantification according to at least two types of battle status information of the first game role.

In an optional embodiment, the quantification module 1040 is configured to: multiply the role level by a level combat power value in a case that the battle status information includes the role level, to obtain a role level combat power of the first game role; and obtain the first combat power value of the first game role through calculation according to the role level combat power.

In an optional embodiment, the quantification module 1040 is configured to: calculate, in a case that the battle status information includes the equipment quantity and the equipment type, an equipment combat power of the first game role according to the following formula:

$$\sum_{n=1}^{N}(L_{mn}*R_n*K_n);$$

and obtain the first combat power value of the first game role through calculation according to the equipment combat power, N representing the equipment quantity owned by the first game role, $L_{mn}$ being an equipment fit factor in a case that the first game role owns equipment n, $R_n$ being a basic combat power bonus of the equipment n, and $K_n$ being a combat power attenuation coefficient in a case that the first game role owns a plurality pieces of the same equipment n at the same time.

In an optional embodiment, the quantification module 1040 is configured to: calculate, in a case that the battle status information includes the skill type and the skill level, a skill combat power of the first game role according to the following formula:

$$\sum_{i=1}^{K}(p_i*s_i+q_i*t_i);$$

and obtain the first combat power value of the first game role through calculation according to the skill combat power, K being a skill quantity of the first game role, i being an ith skill in the K skills, $p_i$ being a boolean variable, $p_i=1$ representing that the first game role has learned the ith skill, $p_i=0$ representing that the first game role has not learned the ith skill, $s_i$ representing a combat power value obtained after the first game role has learned the ith skill, $q_i$ representing a level of the ith skill, and $t_i$ representing an increased combat power in a case that the ith skill is upgraded by one level.

In an optional embodiment, the quantification module 1040 is configured to calculate, in a case that the battle status information includes the buff type and the buff quantity, a buff combat power of the first game role according to the following formula:

$$\sum_{p=1}^{P}(Y_{mp}*U_p),$$

P representing the buff quantity owned by the first game role, and $U_p$ representing a basic combat power bonus of a pth buff.

In an optional embodiment, the apparatus further includes a transmission module 1080.

The transmission module 1080 is configured to transmit the first combat power value of the first game role to a second client in the same battle game, the second client being configured to display a second battle screen, the second battle screen including the first game role and the first combat power value, the first combat power value being located in a peripheral position of the first game role.

In an optional embodiment, the apparatus further includes a transmission module 1080.

The transmission module 1080 is configured to: generate, in a case that the battle status information changes, a combat power change value according to the changed battle status information; and display the combat power change value in a reminder animation mode, the reminder animation mode being an animation display mode in which the combat power change value is displayed in a peripheral position of the first game role according to a preset duration.

In an optional embodiment, the display module 1060 is configured to display a third battle screen, the third battle screen including the first game role and the changed first combat power value, the changed first combat power value being equal to a sum of the first combat power value and the combat power change value.

In an optional embodiment, the quantification module 1040 is configured to: calculate, in a case that the battle status information changes, the changed first combat power value according to the changed battle status information; and subtract the first combat power value from the changed first combat power value to obtain the combat power change value.

In an optional embodiment, the apparatus further includes a transmission module 1080.

The transmission module 1080 is configured to transmit the changed first combat power value to a second client in the same battle game, the second client being configured to display a fourth battle screen, the fourth battle screen including the first game role and the changed first combat power value, the changed first combat power value being located in the peripheral position of the first game role.

In an optional embodiment, the apparatus further includes a receiving module 1090.

The receiving module 1090 is configured to receive a second combat power value of a second game role transmitted by a second client.

The quantification module 1040 is configured to obtain, according to a difference between the second combat power value and the first combat power value, a combat power difference between the second game role and the first game role through calculation.

The display module 1060 is configured to display a fifth battle interface, the fifth battle interface including the second game role and the second combat power value, the second combat power value being located in a peripheral position of the second game role, and a display mode of the second combat power value corresponding to the combat power difference. In an optional embodiment:

in a case that the combat power difference is greater than a first interval threshold, the second combat power value has a first background color;

in a case that the combat power difference is greater than a second interval threshold and is less than the first interval threshold, the second combat power value has a second background color;

in a case that the combat power difference is greater than a third interval threshold and is less than the second interval threshold, the second combat power value has a third background color;

in a case that the combat power difference is greater than a fourth interval threshold and is less than the third interval threshold, the second combat power value has a fourth background color; and in a case that the combat power difference is less than the fourth interval threshold, the second combat power value has a fifth background color;

the first interval threshold>the second interval threshold>the third interval threshold>the fourth interval threshold.

Figure 11:
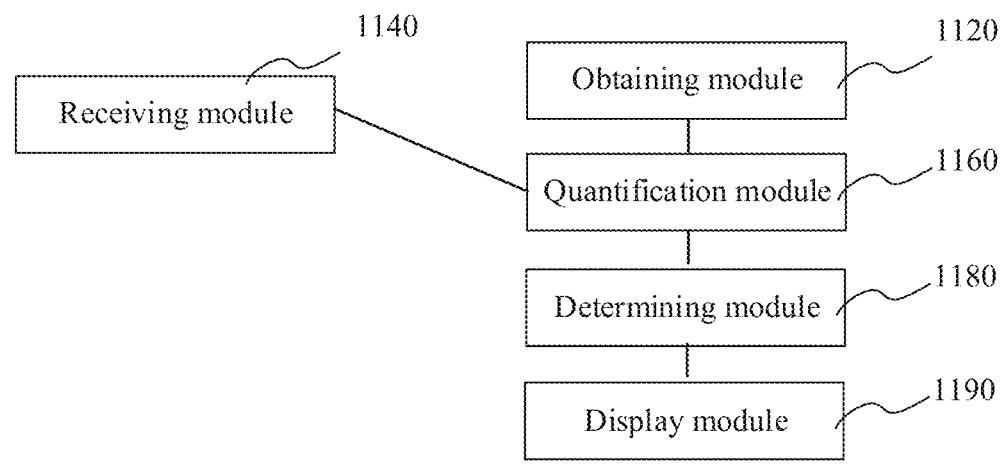
FIG. 11 is a block diagram of an information display apparatus in a battle game according to another example embodiment of the disclosure.

FIG. 11 is a structural block diagram of an information display apparatus in a battle game according to an example embodiment of the disclosure. The apparatus may be implemented as the entire or a part of a first terminal by means of software, hardware, or a combination thereof. The apparatus includes:

an obtaining module 1120, configured to obtain a first combat power value of a first game role, the first game role being a game role controlled by a first client;

a receiving module 1140, configured to receive a second combat power value of a second game role transmitted by a second client in the same battle game, the second game role being a game role controlled by the second client;

a quantification module 1160, configured to obtain, according to the second combat power value and the first combat power value, a combat power difference between the second game role and the first game role through calculation;

a determining module 1180, configured to determine, according to the combat power difference, a display mode of the second combat power value; and a display module 1190, configured to display a battle interface, the battle interface including the second game role and the second combat power value displayed in the display mode, the second combat power value being located in a peripheral position of the second game role.

In an optional embodiment, the determining module 1180 is configured to determine, according to a size relationship between the combat power difference and an interval threshold, the display mode of the second combat power value;

the interval threshold being a critical value used for determining a size of the combat power difference, and the display mode including: at least one of a font size, a font type, a font color, a background color, and a border of the second combat power value.

In an optional embodiment, the display mode includes the background color, and the determining module 1180 is configured to: determine, in a case that the combat power difference is greater than a first interval threshold, that the second combat power value uses a first background color; determine, in a case that the combat power difference is greater than a second interval threshold and is less than the first interval threshold, that the second combat power value uses a second background color; determine, in a case that the combat power difference is greater than a third interval threshold and is less than the second interval threshold, that the second combat power value uses a third background color; determine, in a case that the combat power difference is greater than a fourth interval threshold and is less than the third interval threshold, that the second combat power value uses a fourth background color; and determine, in a case that the combat power difference is less than the fourth interval threshold, that the second combat power value has a fifth background color, the first interval threshold>the second interval threshold>the third interval threshold>the fourth interval threshold.

In an optional embodiment, the obtaining module 1120 is configured to: obtain n types of battle status information of the first game role, the n types of battle status information including information related to a combat power of the first game role, n being an integer greater than or equal to 2; and quantify the n types of battle status information, to obtain a first combat power value of the first game role.

In an optional embodiment, the battle interface further includes the first game role and the first combat power value, the first combat power value being located in a peripheral position of the first game role.

Figure 12:
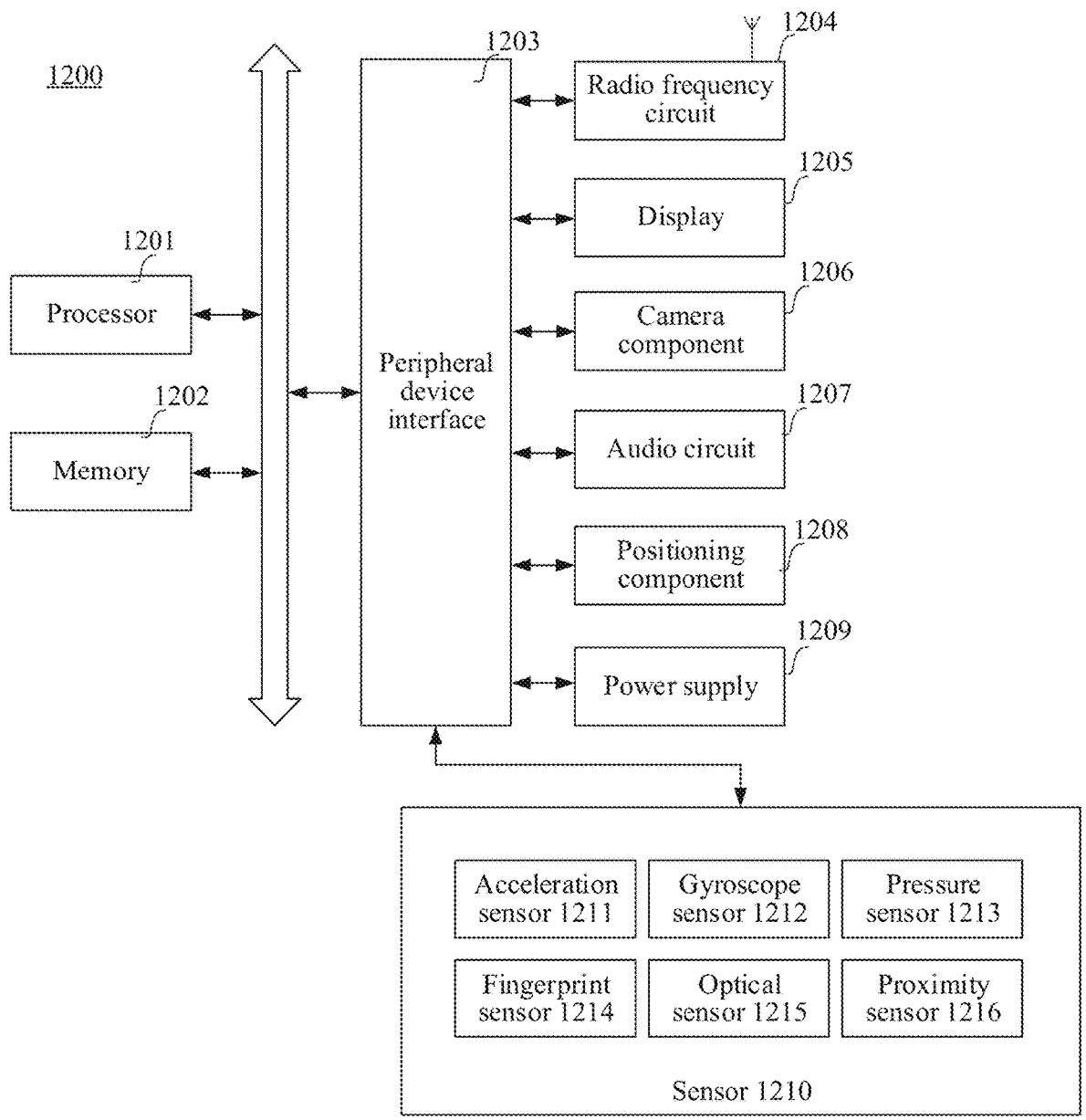
FIG. 12 is a structural block diagram of a terminal according to an example embodiment of the disclosure.

FIG. 12 is a structural block diagram of a terminal 1200 according to an example embodiment of the disclosure. The terminal 1200 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1200 may also be referred to as user equipment, a portable terminal, a laptop terminal, a desktop terminal, or another name. The terminal 1200 may be the first terminal or the second terminal in FIG. 1.

Generally, the terminal 1200 includes a processor 1201 and a memory 1202.

The processor 1201 may include one or more processing cores, for example, may be a 4-core processor or an 8-core processor. The processor 1201 may be implemented by at least one hardware form of a digital signal processor (DSP), a field-programmable gate array (FPGA), and a programmable logic array (PLA). The processor 1201 may alternatively include a main processor and a coprocessor. The main processor is configured to process data in an awake state, also referred to as a central processing unit (CPU), and the coprocessor is a low-power processor configured to process data in a standby state. In some embodiments, the processor 1201 may be integrated with a graphics processing unit (GPU). The GPU is configured to be responsible for rendering and drawing content that a display needs to display. In some embodiments, the processor 1201 may further include an artificial intelligence (AI) processor. The AI processor is configured to process a calculation operation related to machine learning.

The memory 1202 may include one or more computer-readable storage media. The computer-readable storage media may be non-transient. The memory 1202 may further include a high-speed random access memory, and a non-volatile memory such as one or more magnetic disk storage devices and a flash memory device. In some embodiments, the non-transient computer-readable storage medium in the memory 1202 is configured to store at least one instruction. The at least one instruction is executed by the processor 1201 to perform the information display method in a battle game provided in the method embodiment in the disclosure.

In some embodiments, the terminal 1200 further optionally includes a peripheral device interface 1203 and at least one peripheral device. The processor 1201, the memory 1202, and the peripheral device interface 1203 may be connected through a bus or a signal cable. Each peripheral device may be connected to the peripheral device interface 1203 through a bus, a signal cable, or a circuit board. Specifically, the peripheral device includes: at least one of a radio frequency (RF) circuit 1204, a touch display 1205, a camera component 1206, an audio circuit 1207, a positioning component 1208, and a power supply 1209.

The peripheral device interface 1203 may be configured to connect the at least one peripheral device related to input/output (I/O) to the processor 1201 and the memory 1202. In some embodiments, the processor 1201, the memory 1202, and the peripheral device interface 1203 are integrated into the same chip or circuit board. In some other embodiments, any one or two of the processor 1201, the memory 1202, and the peripheral device interface 1203 may be implemented on an independent chip or circuit board, and the implementation is not limited in this embodiment.

The RF circuit 1204 is configured to receive and transmit an RF signal, also referred to as an electromagnetic signal. The RF circuit 1204 communicates with a communications network and another communications device by using the electromagnetic signal. The RF circuit 1204 converts an electric signal into an electromagnetic signal for transmission, or converts a received electromagnetic signal into an electric signal. Optionally, the RF circuit 1204 includes an antenna system, an RF transceiver, one or more amplifiers, a tuner, an oscillator, a digital signal processor, a codec chip set, a subscriber identity module card, and the like. The RF circuit 1204 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1204 may further include a near field communication (NFC) related circuit. This is not limited in the disclosure.

The display 1205 is configured to display a user interface (UI). The UI may include a graph, text, an icon, a video, and any combination thereof. When the display 1205 is a touch display, the display 1205 is further capable of collecting a touch signal on or over a surface of the display 1205. The touch signal may be inputted to the processor 1201 for processing as a control signal. In this case, the display 1205 may be further configured to provide a virtual button and/or a virtual keyboard, which is also referred to as a soft button and/or a soft keyboard. In some embodiments, there may be one display 1205, disposed on a front panel of the terminal 1200. In other some embodiments, there may be at least two displays 1205, disposed on different surfaces of the terminal 1200 respectively or in a folded design. In still other embodiments, the display 1205 may be a flexible display, disposed on a curved surface or a folded surface of the terminal 1200. Even, the display 1205 may be further set in a non-rectangular irregular pattern, namely, a special-shaped screen. The display 1205 may be prepared by using materials such as a liquid crystal display (LCD), an organic light-emitting diode (OLED), or the like.

The camera component 1206 is configured to acquire an image or a video. Optionally, the camera component 1206 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 1206 may further include a flash. The flash may be a single color temperature flash, or may be a double color temperature flash. The double color temperature flash is a combination of a warm light flash and a cold light flash, and may be used for light compensation under different color temperatures.

The audio circuit 1207 may include a microphone and a speaker. The speaker is configured to: collect sound waves of a user and an environment, and convert the sound waves into electrical signals and input the electrical signals into the processor 1201 for processing, or input the electrical signals into the RF circuit 1204 to implement speech communication. For the purpose of stereo collection or noise reduction, there may be a plurality of microphones, disposed at different parts of the terminal 1200 respectively. The microphone may be further an array microphone or an omnidirectional collection microphone. The speaker is configured to convert electrical signals from the processor 1201 or the RF circuit 1204 into sound waves. The speaker may be a conventional thin-film speaker, or may be a piezoelectric ceramic speaker. When the speaker is the piezoelectric ceramic speaker, electrical signals not only may be converted into sound waves that may be heard by human, but also may be converted into sound waves that cannot be heard by human for ranging and other uses. In some embodiments, the audio circuit 1207 may further include an earphone jack.

The positioning component 1208 is configured to locate a current geographic location of the terminal 1200, to implement a navigation or a location based service (LBS). The positioning component 1208 may be a positioning component based on the Global Positioning System (GPS) of the United States, the Beidou Navigation Satellite System (BDS) of China, or the Galileo system of Russia.

The power supply 1209 is configured to supply power for various components in the terminal 1200. The power supply 1209 may be an alternating current, a direct current, a disposable battery, or a rechargeable battery. In a case that the power supply 1209 includes the rechargeable battery, the rechargeable battery may be a wired charging battery or a wireless charging battery. The wired rechargeable battery is a battery charged through a wired circuit, and the wireless rechargeable battery is a battery charged through a wireless coil. The rechargeable battery may further be configured to support a quick charge technology.

In some embodiments, the terminal 1200 may also include one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect accelerations on three coordinate axes of a coordinate system established by the terminal 1200. For example, the acceleration sensor 1211 may be configured to detect components of gravity acceleration on the three coordinate axes. The processor 1201 may control, according to a gravity acceleration signal collected by the acceleration sensor 1211, the touch display 1205 to display the user interface in a frame view or a portrait view. The acceleration sensor 1211 may be further configured to collect motion data of a game or a user.

The gyroscope sensor 1212 may detect a body direction and a rotation angle of the terminal 1200. The gyroscope sensor 1212 may cooperate with the acceleration sensor 1211 to collect a 3D action by the user on the terminal 1200. The processor 1201 may implement the following functions according to data collected by the gyroscope sensor 1212: motion sensing (for example, the UI is changed according to a tilt operation of the user), image stabilization during shooting, game control, and inertial navigation.

The pressure sensor 1213 may be disposed at a side frame of the terminal 1200 and/or a lower layer of the touch display 1205. When the pressure sensor 1213 is disposed on the side frame of the terminal 1200, a holding signal of the user to the terminal 1200 may be detected, and left/right hand identification or a quick action may be performed by the processor 1201 according to the holding signal collected by the pressure sensor 1213. When the pressure sensor 1213 is disposed on the lower layer of the touch display 1205, the processor 1201 controls an operable control on the UI interface according to a pressure operation of the user on the touch display 1205. The operable control includes at least one of a button control, a scroll bar control, an icon control and a menu control.

The fingerprint sensor 1214 is configured to collect a fingerprint of the user. The processor 1201 identifies an identity of the user according to the fingerprint collected by the fingerprint sensor 1214, or the fingerprint sensor 1214 identifies an identity of the user according to the collected fingerprint. When the identity of the user is identified as a trusted identity, the processor 1201 authorizes the user to perform a related sensitive operation. The sensitive operation includes unlocking a screen, viewing encrypted information, downloading software, payment, changing settings, and the like. The fingerprint sensor 1214 may be disposed on a front surface, a back surface, or a side surface of the terminal 1200. When a physical button or a vendor logo is disposed on the terminal 1200, the fingerprint sensor 1214 may be integrated together with the physical button or the vendor logo.

The optical sensor 1215 is configured to collect ambient light intensity. In an embodiment, the processor 1201 may control the display brightness of the touch display 1205 according to the ambient light intensity collected by the optical sensor 1215. Specifically, when the ambient light intensity is relatively high, the display brightness of the touch display 1205 is turned up. When the ambient light intensity is relatively low, the display brightness of the touch display 1205 is turned down. In another embodiment, the processor 1201 may further dynamically adjust shooting parameters of the camera component 1206 according to the ambient light intensity collected by the optical sensor 1215.

The proximity sensor 1216, also referred to as a distance sensor, is generally disposed on the front panel of the terminal 1200. The proximity sensor 1216 is configured to collect a distance between the user and the front surface of the terminal 1200. In an embodiment, when the proximity sensor 1216 detects that the distance between the user and the front surface of the terminal 1200 gradually becomes small, the touch display 1205 is controlled by the processor 1201 to switch from a screen-on state to a screen-off state. When the proximity sensor 1216 detects that the distance between the user and the front surface of the terminal 1200 gradually becomes large, the touch display 1205 is controlled by the processor 1201 to switch from the screen-off state to the screen-on state.

A person skilled in the art would understand that the structure shown in FIG. 12 does not constitute a limitation on the terminal 1200, and the terminal may include more or fewer components than those shown in the figure, or some components may be combined, or a different component deployment may be used.

The disclosure further provides a computer-readable storage medium, storing at least one computer-readable instruction, the at least one computer-readable instruction being loaded and executed by a processor to implement the information display method in a battle game according to the foregoing method embodiments.

Figure 13:
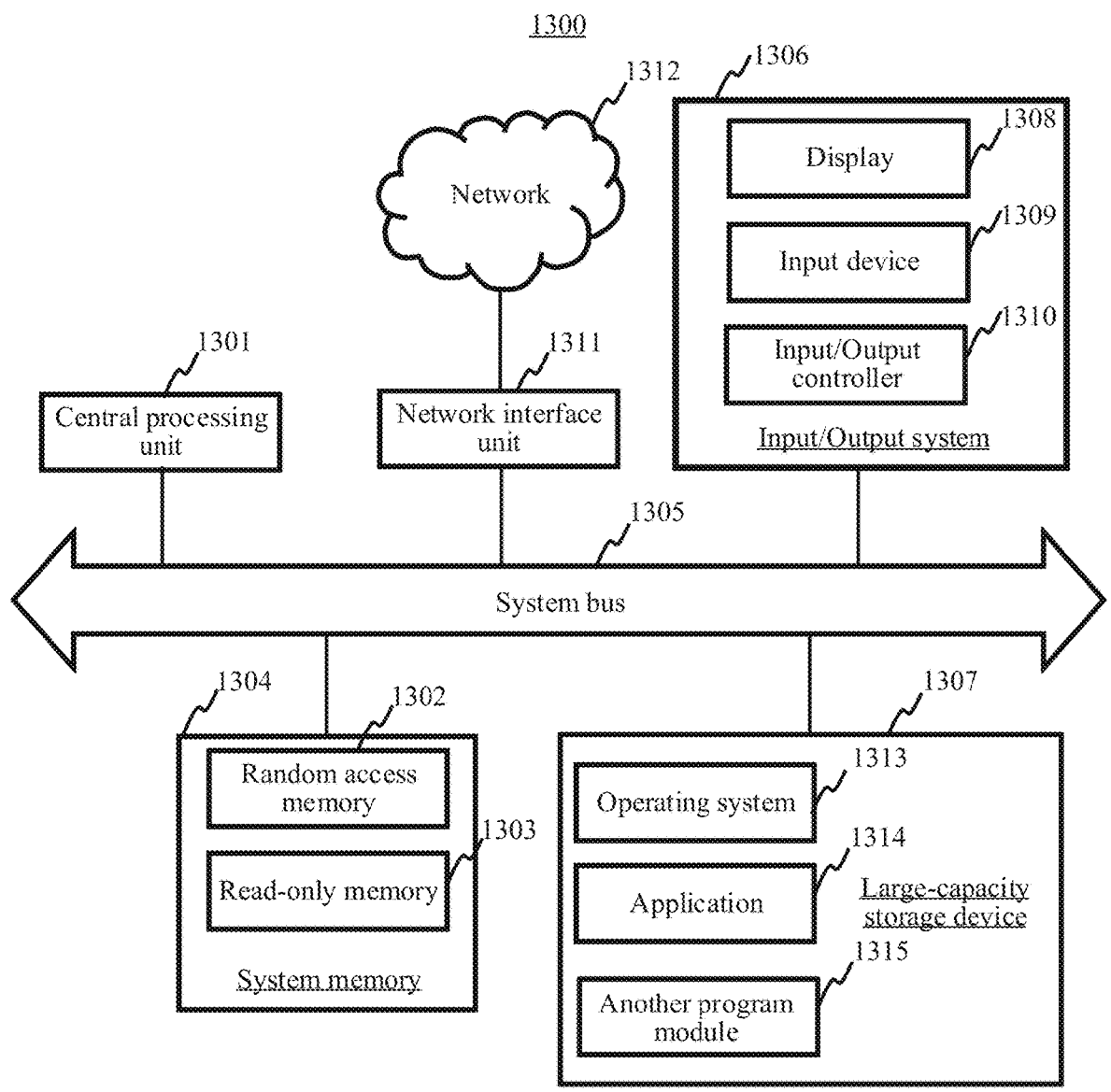
FIG. 13 is a structural block diagram of a server according to an example embodiment of the disclosure.

FIG. 13 is a schematic structural diagram of a server according to an embodiment of the disclosure. Specifically, a server 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The server 1300 further includes a basic input/output system (I/O system) 1306 for transmitting information between components in a computer, and a large-capacity storage device 1307 configured to store an operating system 1313, a client 1314, and another program module 1315.

The basic I/O system 1306 includes a display 1308 configured to display information and an input device 1309 such as a mouse or a keyboard that is configured for information inputting by a user. The display 1308 and the input device 1309 are both connected to the CPU 1301 by an input/output (I/O) controller 1310 connected to the system bus 1305. The basic I/O system 1306 may further include the input/output controller 1310, to receive and process inputs from a plurality of other devices, such as the keyboard, the mouse, or an electronic stylus. Similarly, the input/output controller 1310 further provides an output to a display, a printer or another type of output device.

The large-capacity storage device 1307 is connected to the CPU 1301 by using a large-capacity storage controller (not shown) connected to the system bus 1305. The large-capacity storage device 1307 and an associated computer-readable medium provide non-volatile storage for the server 1300. That is, the large-capacity storage device 1307 may include a computer-readable medium (not shown) such as a hard disk or a compact disc ROM (CD-ROM) drive.

Without loss of generality, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. A person skilled in the art would understand that the computer storage medium is not limited to the foregoing several types. The system memory 1304 and the large-capacity storage device 1307 may be collectively referred to as a memory.

According to various embodiments of the disclosure, the server 1300 may further be connected, by using a network such as the Internet, to a remote computer on the network and run. That is, the server 1300 may be connected to a network 1312 by using a network interface unit 1311 connected to the system bus 1305, or may be connected to another type of network or remote computer system (not shown) by using the network interface unit 1311.

The disclosure further provides a computer-readable storage medium, storing at least one computer-readable instruction, the at least one computer-readable instruction being loaded and executed by a processor to implement the information display method in a battle game according to the foregoing method embodiments.

The disclosure further provides a computer program product, the computer program product, when run on a terminal, causing the terminal to perform the information display method in a battle game according to the foregoing method embodiments.

A person of ordinary skill in the art would understand that all or some of the operations of the embodiments may be implemented by hardware or a program instructing relevant hardware. The program may be stored in a computer-readable storage medium. The storage medium mentioned above may be a read-only memory, a magnetic disk, or an optical disc.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely preferred embodiments of the disclosure, but are not intended to limit the disclosure. Any modification, equivalent replacement, or improvement made without departing from the spirit and principle of the disclosure falls within the protection scope of the disclosure.

What is claimed is:

1. An information display method in a battle game, performed by a terminal on which a first client is run, the method comprising:
    obtaining a first combat power value of a first game role, the first game role being a game role controlled by the first client;
    receiving a second combat power value of a second game role, the second game role being a game role controlled by a second client or an Artificial Intelligence (AI) program;
    obtaining, according to the second combat power value and the first combat power value, a combat power difference between the second game role and the first game role;
    determining, according to the combat power difference, a display mode of the second combat power value; and
    displaying a battle interface, the battle interface comprising an object corresponding to the second game role and the second combat power value displayed in the display mode, the second combat power value being located in a peripheral position of the object corresponding to the second game role,
    wherein the determining comprises:
    determining, according to a size relationship between the combat power difference and at least one interval threshold, the display mode of the second combat power value,
    the display mode comprising at least one of a font size, a font type, a font color, a background color, or a border of the second combat power value.

2. The method according to claim 1, wherein the display mode comprises the background color; and the determining, according to the size relationship between the combat power difference and the at least one interval threshold, the display mode of the second combat power value comprises:
    based on the combat power difference being greater than a first interval threshold, determining a first background color of the second combat power value;
    based on the combat power difference being greater than a second interval threshold and less than the first interval threshold, determining a second background color of the second combat power value;
    based on the combat power difference being greater than a third interval threshold and less than the second interval threshold, determining a third background color of the second combat power value;
    based on the combat power difference being greater than a fourth interval threshold and less than the third interval threshold, determining a fourth background color of the second combat power value; and
    based on the combat power difference being less than the fourth interval threshold, determining a fifth background color of the second combat power value,
    relationships between the first, the second, the third, and the fourth interval thresholds being the first interval threshold>the second interval threshold>the third interval threshold>the fourth interval threshold.

3. The method according to claim 1, wherein the obtaining the first combat power value of the first game role comprises:
    obtaining n types of battle status information of the first game role, the n types of battle status information comprising information related to a combat power of the first game role, n being an integer greater than or equal to 2; and
    quantifying the n types of battle status information, to obtain the first combat power value of the first game role.

4. The method according to claim 1, wherein the battle interface further comprises an object corresponding to the first game role and the first combat power value, the first combat power value being located in a peripheral position of the object corresponding to the first game role.

5. The method according to claim 4, wherein the displaying the battle interface comprises:
    obtaining a virtual environment screen with the first game role as an observation target, the virtual environment screen being generated according to a virtual environment in which the first game role is located; and displaying the battle interface by superimposing the first combat power value on the peripheral position of the object corresponding to the first game role in the virtual environment screen.

6. The method according to claim 3, wherein then types of battle status information comprise at least two from among:
   a role level of the first game role;
   an equipment quantity and an equipment type owned by the first game role;
   a skill type and a skill level owned by the first game role; and
   a buff type and a buff quantity owned by the first game role.

7. The method according to claim 6, wherein then types of battle status information comprises the role level of the first game role, and the quantifying comprises:
   multiplying the role level by a level combat power value, to obtain a role level combat power of the first game role; and
   obtaining the first combat power value of the first game role according to the role level combat power.

8. The method according to claim 6, wherein then types of battle status information comprises the equipment quantity and the equipment type, and the quantifying comprises:
   obtaining an equipment combat power of the first game role according to the following formula:

$$\sum_{n=1}^{N}(L_{mn}*R_n*K_n);$$

and
   obtaining the first combat power value of the first game role according to the equipment combat power,
   N representing the equipment quantity owned by the first game role, $L_{mn}$ being an equipment fit factor corresponding to the first game role m that owns equipment n, $R_n$ being a basic combat power bonus of the equipment n, and $K_n$ being a combat power attenuation coefficient corresponding to the first game role m that owns a plurality pieces of the same equipment n at the same time.

9. The method according to claim 6, wherein then types of battle status information comprises the skill type and the skill level, and the quantifying the n types of battle status information, to obtain the first combat power value of the first game role comprises:
   obtaining a skill combat power of the first game role according to the following formula:

$$\sum_{i=1}^{K}(p_i*s_i+q_i*t_i);$$

and
   obtaining the first combat power value of the first game role according to the skill combat power,
   K being a skill quantity of the first game role, i being an ith skill in K skills, $p_i$ being a boolean variable, $p_i=1$ representing that the first game role has learned the ith skill, $p_i=0$ representing that the first game role has not learned the ith skill, $s_i$ representing a combat power value obtained after the first game role has learned the ith skill, $q_i$ representing a level of the ith skill, and $t_i$ representing an increased combat power in a case that the ith skill is upgraded by one level.

10. The method according to claim 6, wherein the n types of battle status information comprises the buff type and the buff quantity, and the quantifying comprises:
   obtaining a buff combat power of the first game role according to the following formula:

$$\sum_{p=1}^{P}(Y_{mp}*U_p);$$

P representing the buff quantity owned by the first game role, $U_p$ representing a basic combat power bonus of a pth buff, and $Y_{mp}$ representing a buff fit factor corresponding to the first game role m that owns the pth buff.

11. The method according to claim 5, further comprising:
   transmitting the first combat power value of the first game role to the second client in the same battle game to be displayed on a screen of the second client.

12. The method according to claim 5, further comprising:
   in response to a change of battle status information, generating a combat power change value according to the changed battle status information; and
   displaying the combat power change value in an animation display mode in which the combat power change value is displayed in the peripheral position of the object corresponding to the first game role according to a preset duration.

13. The method according to claim 12, wherein the battle interface further comprises a changed first combat power value, the changed first combat power value being equal to a sum of the first combat power value and the combat power change value.

14. An apparatus for use in a battle game, a first client being run on the apparatus, the apparatus comprising:
   at least one memory configured to store program code; and
   at least one processor configured to read the program code and operate as instructed by the program code, the program code comprising:
      obtaining code configured to cause at least one of the at least one processor to obtain a first combat power value of a first game role, the first game role being a game role controlled by the first client;
      receiving code configured to cause at least one of the at least one processor to receive a second combat power value of a second game role, the second game role being a game role controlled by a second client or an Artificial Intelligence (AI) program;
      quantification code configured to cause at least one of the at least one processor to obtain, according to the second combat power value and the first combat power value, a combat power difference between the second game role and the first game role;
      determining code configured to cause at least one of the at least one processor to determine, according to the combat power difference, a display mode of the second combat power value; and
      display code configured to cause at least one of the at least one processor to display a battle interface, the battle interface comprising an object corresponding to the second game role and the second combat power value displayed in the display mode, the second combat power value being located in a peripheral position of the object corresponding to the second game role, wherein the determining code is further configured to cause at least one of the at least one processor to determine, according to a size relationship between the combat power difference and at least one interval threshold, the display mode of the second combat power value, the display mode comprising at least one of a font size, a font type, a font color, a background color, or a border of the second combat power value.

15. The apparatus according to claim 14, wherein the display mode comprises the background color; and the determining code further causes at least one of the at least one processor to:

based on the combat power difference being greater than a first interval threshold, determine a first background color of the second combat power value;

based on the combat power difference being greater than a second interval threshold and less than the first interval threshold, determine a second background color of the second combat power value;

based on the combat power difference being greater than a third interval threshold and less than the second interval threshold, determine a third background color of the second combat power value;

based on the combat power difference being greater than a fourth interval threshold and less than the third interval threshold, determine a fourth background color of the second combat power value; and based on the combat power difference being less than the fourth interval threshold, determine a fifth background color of the second combat power value, relationships between the first, the second, the third, and the fourth interval thresholds being the first interval threshold>the second interval threshold>the third interval threshold>the fourth interval threshold.

16. The apparatus according to claim 14, wherein the obtaining code further causes at least one of the at least one processor to obtain n types of battle status information of the first game role, the n types of battle status information comprising information related to a combat power of the first game role, n being an integer greater than or equal to 2, and quantify the n types of battle status information, to obtain the first combat power value of the first game role.

17. The apparatus according to claim 14, wherein the battle interface further comprises an object corresponding to the first game role and the first combat power value, the first combat power value being located in a peripheral position of the object corresponding to the first game role.

18. A non-transitory computer-readable storage medium, storing at least one computer-readable instruction, the at least one computer-readable instruction being loaded and executed by a processor to perform:

obtaining a first combat power value of a first game role, the first game role being a game role controlled by a first client;

receiving a second combat power value of a second game role, the second game role being a game role controlled by a second client or an Artificial Intelligence (AI) program;

obtaining, according to the second combat power value and the first combat power value, a combat power difference between the second game role and the first game role;

determining, according to the combat power difference, a display mode of the second combat power value; and displaying a battle interface, the battle interface comprising an object corresponding to the second game role and the second combat power value displayed in the display mode, the second combat power value being located in a peripheral position of the object corresponding to the second game role, wherein the obtaining the first combat power value of the first game role comprises:

obtaining n types of battle status information of the first game role, the n types of battle status information comprising information related to a combat power of the first game role, n being an integer greater than or equal to 2; and quantifying the n types of battle status information, to obtain the first combat power value of the first game role.

* * * * *